US008989755B2

(12) United States Patent
Muruganathan et al.

(10) Patent No.: US 8,989,755 B2
(45) Date of Patent: Mar. 24, 2015

(54) METHODS OF INTER-CELL RESOURCE SHARING

(71) Applicant: BlackBerry Limited, Waterloo (CA)

(72) Inventors: Siva Dharshan Muruganathan, Sittsville (CA); Yongkang Jia, Ottawa (CA); Yi Song, Plano, TX (US); Hua Xu, Ottawa (CA); Vahid Pourahmadi, Ottawa (CA); Robert Mark Harrison, Grapevine, TX (US); Shiwei Gao, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 50 days.

(21) Appl. No.: 13/777,794

(22) Filed: Feb. 26, 2013

(65) Prior Publication Data
US 2014/0243002 A1    Aug. 28, 2014

(51) Int. Cl.
H04W 72/00    (2009.01)
H04W 72/08    (2009.01)
H04W 72/04    (2009.01)
H04L 5/00    (2006.01)

(52) U.S. Cl.
CPC ........ *H04W 72/082* (2013.01); *H04W 72/0426* (2013.01); *H04W 72/0433* (2013.01); *H04L 5/0035* (2013.01); *H04L 5/001* (2013.01); *H04L 5/0023* (2013.01); *H04L 5/0048* (2013.01); *H04L 5/0078* (2013.01); *H04L 5/0094* (2013.01); *H04L 5/0073* (2013.01)
USPC ..... 455/450; 455/550.1; 455/509; 455/114.2; 370/328; 370/311; 370/252; 370/329

(58) Field of Classification Search
USPC ............ 455/550.1, 509, 450, 114.2; 375/144; 370/328, 311, 252, 329
See application file for complete search history.

(56) References Cited

U.S. PATENT DOCUMENTS

| 8,509,836 | B2 | 8/2013 | Shin et al. |
| 8,902,842 | B1 | 12/2014 | Gomadam et al. |
| 2008/0108363 | A1 | 5/2008 | Yu et al. |
| 2010/0267408 | A1 | 10/2010 | Lee et al. |
| 2011/0038310 | A1* | 2/2011 | Chmiel et al. ................. 370/328 |

(Continued)

FOREIGN PATENT DOCUMENTS

| WO | 2012096476 A2 | 7/2012 |
| WO | WO 2012096476 A2 * | 7/2012 |

OTHER PUBLICATIONS

3GPP TSG RAN WG1 Meeting #70bis; "Association Between DM-RS Ports and EPDCCH Transmission"; R1-124242; San Diego, USA; Oct. 8-12, 2012; 4 pages.

(Continued)

*Primary Examiner* — David Q Nguyen
(74) *Attorney, Agent, or Firm* — Conley Rose, P.C.; J. Robert Brown, Jr.; Jonathan K. Polk

(57) ABSTRACT

A method for communication in a wireless telecommunication network is provided. The method comprises transmitting, by a first cell, to a first UE, a first signal on a resource block configured to be shared by more than one cell; and transmitting, by a second cell, to a second UE, a second signal on the same resource block, wherein a specification of a location of the resource block is included in configuration information available to the first cell and the second cell.

26 Claims, 15 Drawing Sheets

(56) References Cited

U.S. PATENT DOCUMENTS

| | | | |
|---|---|---|---|
| 2011/0268046 | A1 | 11/2011 | Choi et al. |
| 2012/0082052 | A1 | 4/2012 | Oteri et al. |
| 2012/0202540 | A1 | 8/2012 | Lee et al. |
| 2012/0202558 | A1 | 8/2012 | Hedberg et al. |
| 2012/0281683 | A1 | 11/2012 | Falconetti et al. |
| 2013/0100901 | A1 | 4/2013 | Shan et al. |
| 2013/0114438 | A1* | 5/2013 | Bhattad et al. ............ 370/252 |
| 2013/0121276 | A1 | 5/2013 | Kim et al. |
| 2013/0208604 | A1 | 8/2013 | Lee et al. |
| 2013/0315157 | A1 | 11/2013 | Krishnamurthy et al. |
| 2014/0036747 | A1* | 2/2014 | Nory et al. ................. 370/311 |
| 2014/0092827 | A1 | 4/2014 | Jongren et al. |
| 2014/0126402 | A1 | 5/2014 | Nam et al. |
| 2014/0126496 | A1 | 5/2014 | Sayana et al. |
| 2014/0185530 | A1* | 7/2014 | Kuchibhotla et al. ...... 370/329 |
| 2014/0187283 | A1* | 7/2014 | Nimbalker et al. ...... 455/550.1 |
| 2014/0321313 | A1 | 10/2014 | Seo et al. |
| 2014/0369293 | A1 | 12/2014 | Guo et al. |

OTHER PUBLICATIONS

3GPP TSG RAN WG1 Meeting #65; "Discussions on DL Control Signaling Enhancment"; R1-111789; Barcelona, Spain; May 9-13, 2011; 3 pages.

Xincheng, Zhang, et al.; "Reference Signal Design"; Excerpt from "LTE-Advanced Air Interface Technology"; CRC Press; Sep. 12, 2012; 29 pages.

3GPP TSG-RAN WG1 LTE Ad Hoc Meeting; "Combining Inter-cell-interference Co-ordination/avoidance with Cancellation in Downlink and TP"; R1-060200; Helsinki, Finland; Jan. 23-25, 2006; 3 pages.

PCT International Search Report; Application No. PCT/US2013/071514; Jun. 5, 2014; 6 pages.

PCT Written Opinion of the International Searching Authority; Application No. PCT/US2013/071514; Jun. 5, 2014; 9 pages.

PCT International Search Report; Application No. PCT/US2014/015839; Apr. 28, 2014; 4 pages.

PCT Written Opinion of the International Searching Authority; Application No. PCT/US2014/015839; Apr. 28, 2014; 7 pages.

PCT International Search Report; Application No. PCT/US2013/071672; Apr. 2, 2014; 3 pages.

PCT Written Opinion of the International Searching Authority; Application No. PCT/US2013/071672; Apr. 2, 2014; 8 pages.

Final Office Action dated May 14, 2014; U.S. Appl. No. 13/360,399, filed Jan. 27, 2012; 18 pages.

Tabet, Tarik, et al.; U.S. Appl. No. 13/360,399, filed Jan. 27, 2012; Title: Interference Management in a Wireless Network.

Pourahmadi, Vahid, et al.; U.S. Appl. No. 13/773,408, filed Feb. 21, 2013; Title: Methods of Interference Measurement for Advanced Receiver in LTE/LTE-A.

Pourahmadi, Vahid, et al.; U.S. Appl. No. 13/773,413, filed Feb. 21, 2013; Title: Interference Measurement Methods for Advanced Receiver in LTE/LTE-A.

Yue, Jiang, et al.; "Channel Estimation and Data Detection for MIMO-OFDM Systems"; IEEE Globecom; 2003; 5 pages.

Kim, J.W., et al.; "Noise Subspace Approach for Interference Cancellation"; IEEE Electronics Letters; Issue 11, vol. 25; May 25, 1989; 2 pages.

ETSI TS 136 214 V9.1.0; LTE; Evolved Universal Terrestrial Radio Access (E-UTRA); Physical Layer—Measurements (3GPP TS 36.214 V9.1.0; Release 9); Apr. 2010; 15 pages.

ETSI TS 136 213 V9.1.0; LTE; Evolved Universal Terrestrial Radio Access (E-UTRA); Physical Layer Procedures (3GPP TS 36.213 V9.1.0; Release 9); Apr. 2010; 81 pages.

3GPP TS 36.423 V11.2.0; 3rd Generation Partnership Project; Technical Specification Group Radio Access Network; Evolved Universal Terrestrial Radio Access (E-UTRA); X2 Application Protocol (X2AP); Release 11; Sep. 2012; 136 pages.

3GPP TSG-RAN WG1 Meeting #65; "Coordinated Transmission in Support of Interference Aware Receivers"; R1-111561; Barcelona, Spain; May 9-13, 2011; 7 pages.

3GPP TSG RAN WG1 Meeting #66; "CRS Interference Cancellation in HetNet Scenarios for UE Performance Requirements"; R1-112507; Athens, Greece; Aug. 22-26, 2011; 3 pages.

3GPP TSG-RAN WG1 Meeting #66; "Analysis of CRS and PDSCH Collisions in Scenarios 3 and 4"; R1-112226; Athens, Greece; Aug. 22-26, 2011; 6 pages.

3GPP TSG RAN WG1 Meeting #66; "Handling the Legacy Transmission in ABS"; R1-112332; Athens, Greece; Aug. 22-26, 2011; 4 pages.

3GPP TSG RAN WG1 Meeting #66; "Considerations on Interference Measurement and Its Specification"; R1-112110; Athens, Greece; Aug. 22-26, 2011; 5 pages.

3GPP TS 36.331 V9.4.0; 3rd Generation Partnership Project; Technical Specification Group Radio Access Network; Evolved Universal Terrestrial Radio Access (E-UTRA); Radio Resource Control (RRC); Protocol Specification; Release 9; Sep. 2010; 252 pages.

3GPP TS 36.331 V11.2.0; 3rd Generation Partnership Project; Technical Specification Group Radio Access Network; Evolved Universal Terrestrial Radio Access (E-UTRA); Radio Resource Control (RRC); Protocol Specification; Release 11; Dec. 2012; 340 pages.

3GPP TR 36.819 V11.1.0; 3rd Generation Partnership Project; Technical Specification Group Radio Access Network; Coordinated Multi-Point Operation for LTE Physical Layer Aspects; Release 11; Dec. 2011; 69 pages.

3GPP TS 36.213 V11.0.0; 3rd Generation Partnership Project; Technical Specification Group Radio Access Network; Evolved Universal Terrestrial Radio Access (E-UTRA); Physical Layer Procedures; Release 11; Sep. 2012; 143 pages.

3GPP TS 36.300 V11.3.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 11; Sep. 2012; 205 pages.

3GPP TR 36.829 V11.0.0; 3rd Generation Partnership Project; Technical Specification Group Radio Access Network; Enhanced Performance Requirement for LTE User Equipment (UE); Release 11; Mar. 2012; 83 pages.

3GPP TS 36.211 V10.5.0; 3rd Generation Partnership Project; Technical Specification Group Radio Access Network; Evolved Universal Terrestrial Radio Access (E-UTRA); Physical Channels and Modulation; Release 10; Jun. 2012; 101 pages.

PCT International Search Report; Application No. PCT/US2012/022977; Sep. 27, 2012; 3 pages.

PCT Written Opinion of the International Searching Authority; Application No. PCT/US2012/022977; Sep. 27, 2012; 6 pages.

ETSI TS 136 133 V9.3.0; LTE; Evolved Universal Terrestrial Radio Access (E-UTRA); Requirements for Support of Radio Resource Management (3GPP TS 36.133 V9.3.0; Release 9); Apr. 2010; 180 pages. (Part 1).

ETSI TS 136 133 V9.3.0; LTE; Evolved Universal Terrestrial Radio Access (E-UTRA); Requirements for Support of Radio Resource Management (3GPP TS 36.133 V9.3.0; Release 9); Apr. 2010; 183 pages. (Part 2).

Dahlman, Erik, et al.; "4G LTE/LTE-Advanced for Mobile Broadband"; Mar. 29, 2011; 61 pages.

3GPP TSG RAN WG1 Meeting #68bis; "UE-Specific DM-RS Configuration"; R1-121093; Jeju, Korea; Mar. 26-30, 2012; 4 pages.

Office Action dated Oct. 3, 2013; U.S. Appl. No. 13/360,399, filed Jan. 27, 2012; 26 pages.

PCT International Partial Search Report; Application No. PCT/US2013/071514; Mar. 7, 2014; 6 pages.

Office Action dated Aug. 1, 2014; U.S. Appl. No. 13/773,408, filed Feb. 21, 2013; 39 pages.

Office Action dated Aug. 1, 2014; U.S. Appl. No. 13/773,413, filed Feb. 21, 2013; 36 pages.

Final Office Action dated Jan. 12, 2015; U.S. Appl. No. 13/773,408, filed Feb. 21, 2013; 33 pages.

Final Office Action dated Jan. 12, 2015; U.S. Appl. No. 13/773,413, filed Feb. 21, 2013; 32 pages.

* cited by examiner

RBs in which Cell A cannot promise about the Tx power normalized by the cell maximum output power being below the RNTP threshold

METHODS OF INTER-CELL RESOURCE SHARING

FIELD OF THE DISCLOSURE

The present disclosure relates to interference measurement in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node or a network element.

Any set of cells that includes one or more cells with a smaller coverage area than the typical coverage area of a traditional eNB may be referred to herein as a small cell deployment. A cell with the relatively large coverage area provided by a traditional eNB may be referred to herein as a macro cell. A cell with a relatively smaller coverage area than a macro cell may be referred to herein as a small cell, a pico cell, or a femto cell. Alternatively or additionally, a macro cell may be considered a high power cell, and a small cell may be considered a low power cell. The access node in a macro cell may be referred to as a macro eNB or a macro node, and the access node in a small cell may be referred to as a small cell eNB, a pico eNB or a femto eNB.

LTE may be said to correspond to Third Generation Partnership Project (3GPP) Release 8 (Rel-8), Release 9 (Rel-9), and Release 10 (Rel-10), and possibly also to releases beyond Release 10, while LTE Advanced (LTE-A) may be said to correspond to Release 10, Release 11 (Rel-11), and possibly also to releases beyond Release 10 and Release 11. As used herein, the terms "legacy", "legacy UE", and the like might refer to signals, UEs, and/or other entities that comply with LTE Release 10 and/or earlier releases but do not comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

Embodiments of the present disclosure provide systems and methods for inter-cell resource sharing. To aid in the description of the embodiments, some background information will first be provided regarding LTE subframes, small cells and macro cells, LTE load indications and status reporting, coordinated multipoint schemes, relative narrowband transmit power indications, almost blank subframes, advanced receivers, and inter-cell interference.

Figure 1:
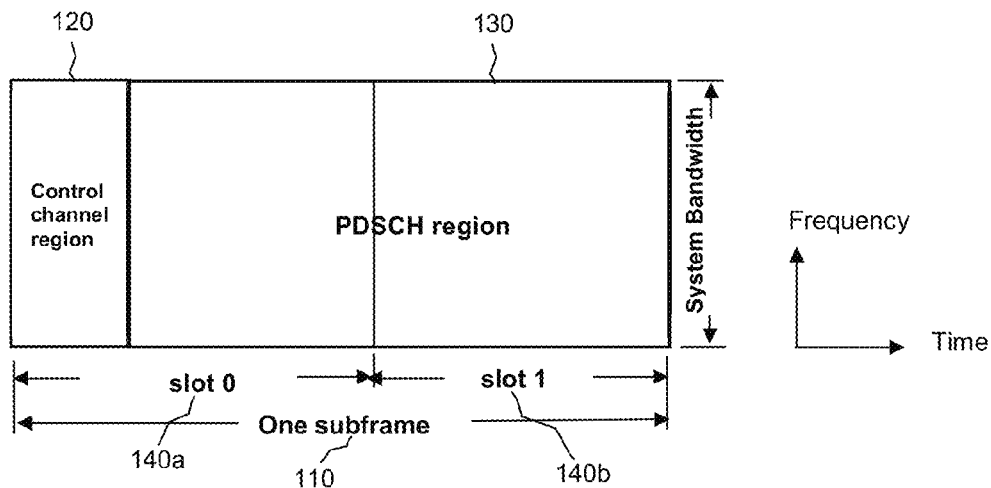
FIG. 1 is a diagram of a downlink LTE subframe according to the prior art.

FIG. 1 illustrates a typical downlink (DL) LTE subframe 110. Control information such as the physical downlink control channel (PDCCH), the physical control format indicator channel (PCFICH), and the physical HARQ (hybrid automatic repeat request) indicator channel (PHICH) are transmitted in a control channel region 120. The control channel region 120 includes the first few OFDM (orthogonal frequency division multiplexing) symbols in the subframe 110. The exact number of OFDM symbols for the control channel region 120 is either dynamically indicated by the PCFICH, which is transmitted in the first symbol, or semi-statically configured when cross carrier scheduling is configured in the case of carrier aggregation in LTE Rel-10.

The PDSCH (physical downlink shared channel), PBCH (physical broadcast channel), PSC/SSC (primary synchronization channel/secondary synchronization channel), and CSI-RS (channel state information reference signal) are transmitted in a PDSCH region 130. DL user data is carried by the PDSCH channels scheduled in the PDSCH region 130. Cell-specific reference signals are transmitted over both the control channel region 120 and the PDSCH region 130.

Each subframe 110 can include a number of OFDM symbols in the time domain and a number of subcarriers in the frequency domain. An OFDM symbol in time and a subcarrier in frequency together define a resource element (RE). A physical resource block (RB or PRB) can be defined as, for example, 12 consecutive subcarriers in the frequency domain and all the OFDM symbols in a slot in the time domain. An RB pair with the same RB index in slot 0 (140a) and slot 1 (140b) in a subframe can be allocated together.

Figure 2:
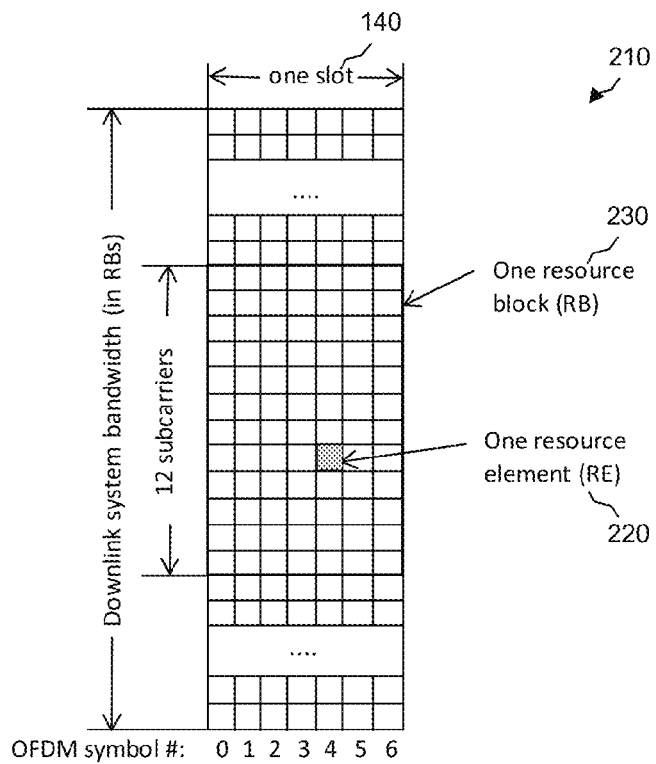
FIG. 2 is a diagram of an LTE downlink resource grid in the case of a normal cyclic prefix according to the prior art.

FIG. 2 shows an LTE DL resource grid 210 within each slot 140 in the case of a normal cyclic prefix (CP) configuration. The resource grid 210 is defined for each antenna port, i.e., each antenna port has its own separate resource grid 210. Each element in the resource grid 210 for an antenna port is an RE 220, which is uniquely identified by an index pair of a subcarrier and an OFDM symbol in a slot 140. An RB 230 includes a number of consecutive subcarriers in the frequency domain and a number of consecutive OFDM symbols in the time domain, as shown in the figure. An RB 230 is the minimum unit used for the mapping of certain physical channels to REs 220.

Dense small cell deployments have been suggested as a technique to meet the explosive growth in demand for capacity in wireless telecommunications systems. Small cells using low-power nodes are considered promising in this regard, especially for hotspot area deployments in indoor and outdoor scenarios. A low-power node generally means a node whose transmission power is lower than that of a macro node.

Figure 3:
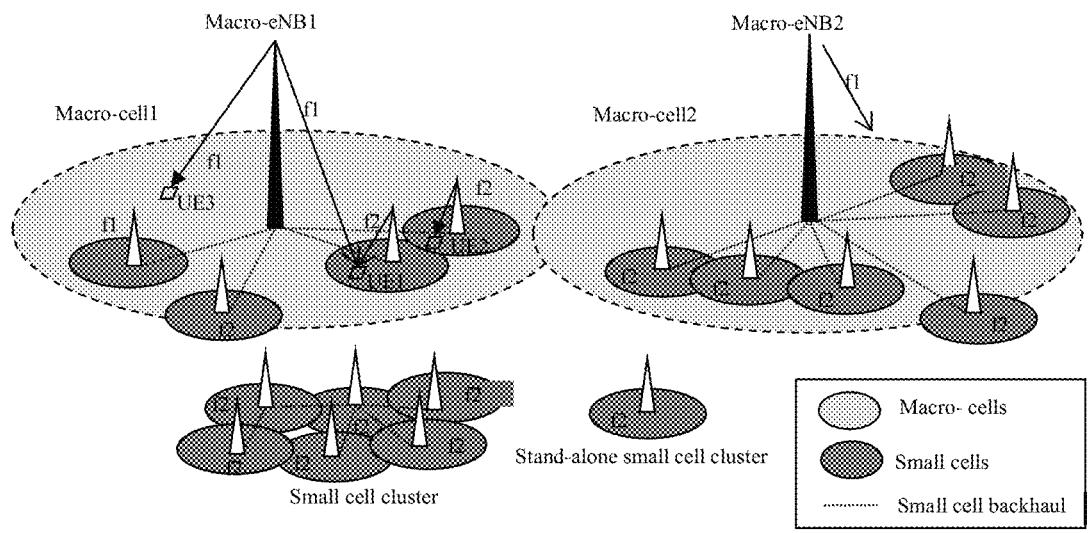
FIG. 3 is a diagram of deployment scenarios of small cells with and without macro coverage according to the prior art.

Some possible small cell deployment scenarios of interest are shown in FIG. 3. In one scenario, a small cell may operate at the same frequency as the overlain macro cell. In another scenario, the small cell layer may operate on an entirely different frequency band from the overlaying macro cell. For instance, the macro layer may operate on a low frequency band such as 700 megahertz (MHz), and the small cell layer may operate on a high frequency band such as 3.5 gigahertz (GHz). One of the advantages of such a deployment scenario is that interference between a small cell and the macro cell may be avoided. Another advantage is that when a UE is under the coverage of both a small cell and a macro cell, the UE may be served by both cells simultaneously. Using this multi-connectivity approach enables the UE to receive control plane information from the overlaying macro cell and user plane data communications from one or more small cells. In another scenario, a cluster of small cells or an isolated small cell may be operated on a given frequency band and may be deployed outside the coverage area of an overlaying macro cell.

In all of these scenarios, a communication link typically exists between a small cell eNB and an overlaying macro eNB or between two small cell eNBs. While the X2 interface can refer to a logical interface used to communicate network control information between eNBs, as used herein, the terms "X2 interface", "backhaul link", or "backhaul" may refer to an interface between any access nodes that is used for the purpose of exchanging network control information. The physical backhaul link between two eNBs may be a direct point-to-point connection or may be routed through another network. The one-way latency of a backhaul link can range from 5 milliseconds (ms) to up to 60 ms in practice. This latency may need to be considered in small cell enhancements.

Figure 4:
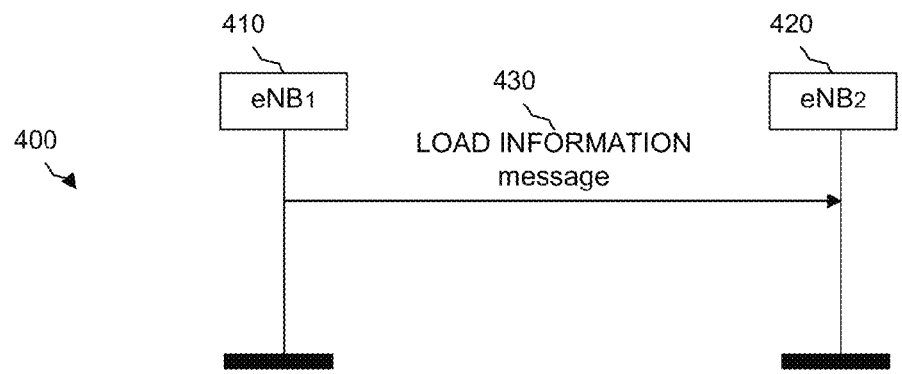
FIG. 4 is a diagram of a load indication over the X2 interface according to the prior art.

In 3GPP LTE, the Load Indication procedure over the X2 interface transfers load and interference coordination information between eNBs, as shown in FIG. 4. A first eNB 410 initiates the procedure 400 by sending a LOAD INFORMATION message 430 to a second eNB 420 controlling intra-frequency neighboring cells. In some cases, the first eNB 410 may send the LOAD INFORMATION message 430 to a plurality of other eNBs. According to 3GPP Technical Specification (TS) 36.423, the following may be part of the LOAD INFORMATION message.

If the Relative Narrowband Tx Power (RNTP) information element (IE) is received in the LOAD INFORMATION message, that IE indicates, per PRB, whether the downlink transmission power, normalized by the cell maximum output power, is lower than the value indicated by the RNTP Threshold IE. The receiving eNB may take such information into account when setting the receiving eNB's scheduling policy and may consider the received RNTP IE value valid until reception of a new LOAD INFORMATION message carrying an update.

If the Almost Blank Subframe (ABS) Pattern Information IE is included in the LOAD INFORMATION message, that IE indicates the subframes over which there is no or low DL transmission activity from the sending eNB and thus whether there is no or low interference from the sending eNB. The receiving eNB may take such information into consideration when scheduling UEs.

If the Invoke Indication IE is included in the LOAD INFORMATION message, that IE indicates which type of information the sending eNB would like the receiving eNB to send back. The receiving eNB may take such a request into account.

Figure 5:
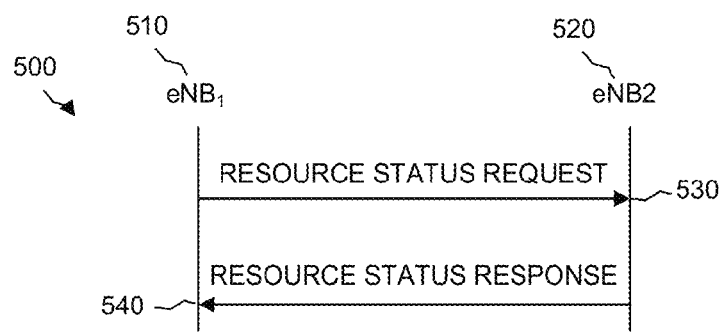
FIG. 5 is a diagram of resource status reporting initiation over the X2 interface according to the prior art.

Furthermore, a resource status reporting initiation procedure exists in LTE which involves two messages exchanged between two eNBs over the X2 interface, as shown in FIG. 5. According to 3GPP TS 36.423, the resource status reporting initiation procedure involves the following components.

The procedure 500 is initiated with a RESOURCE STATUS REQUEST message 530 sent from eNB$_1$ 510 to eNB$_2$ 520. Upon receipt, eNB$_2$ 520 initiates the requested measurement according to the parameters given in the request if the Registration Request IE is set to "start" and stops all cell measurements and terminates the reporting if the Registration Request IE is set to "stop".

If the Registration Request IE is set to "start", then the Report Characteristics IE is included in the RESOURCE STATUS REQUEST message 530. The Report Characteristics IE indicates the types of objects eNB$_2$ 520 performs measurements on.

If eNB$_2$ 520 is capable of providing all requested resource status information, eNB$_2$ 520 initiates the measurement as requested by eNB$_1$ 510 and responds with a RESOURCE STATUS RESPONSE message 540.

If none of the requested measurements can be initiated, eNB$_2$ 520 sends a RESOURCE STATUS FAILURE message instead of a RESOURCE STATUS RESPONSE message 540.

Figure 6:
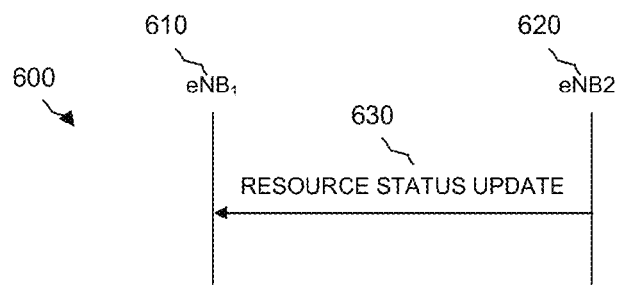
FIG. 6 is a diagram of a resource status reporting procedure over the X2 interface according to the prior art.

Following a successful resource status initiation procedure, the resource status reporting procedure takes place over the X2 interface, as illustrated in FIG. 6. According to 3GPP TS 36.423, the resource status reporting procedure may be described as follows.

In the procedure 600, the eNB$_2$ 620 reports the results of the admitted measurements in a RESOURCE STATUS UPDATE message 630 to eNB$_1$ 610. The admitted measurements are the measurements that were successfully initiated during the resource status reporting initiation procedure 500 and thus are not reported in the Measurement Failed Report Characteristics IE for the concerned cell in the RESOURCE STATUS RESPONSE message 540.

Figure 7:
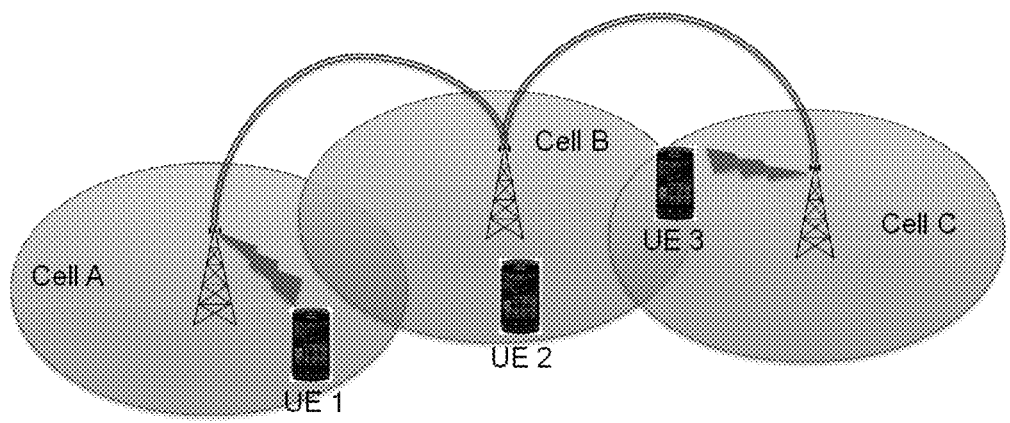
FIG. 7 is a diagram of an example of coordinated scheduling according to the prior art.

Various forms of downlink coordinated multipoint (CoMP) transmission schemes have been previously considered with the aim of improving cell edge user performance. One form of downlink CoMP, referred to as coordinated scheduling (CS), is illustrated in FIG. 7. In the example shown in FIG. 7, neighboring cells labeled A, B, and C coordinate their respective scheduling such that cell B either reduces its transmission power or avoids scheduling UE 2 (which is assumed to be served by Cell B) on a given set of time-frequency resources to reduce the interference to adjacent cell UEs 1 and 3. This allows cell edge UEs 1 and 3 to be served by their respective Cells A and C on the given set of time-frequency resources (i.e., the resources in which Cell B reduces its transmission power or avoids scheduling UE 2). In general, CS schemes assume that data for a given UE is only available at and transmitted from one cell. It may be noted, however, that CS involves dynamic coordination among multiple cells, which may require the backhaul link interconnecting the cells participating in CS to have low latency on the order of a few milliseconds.

Figure 8:
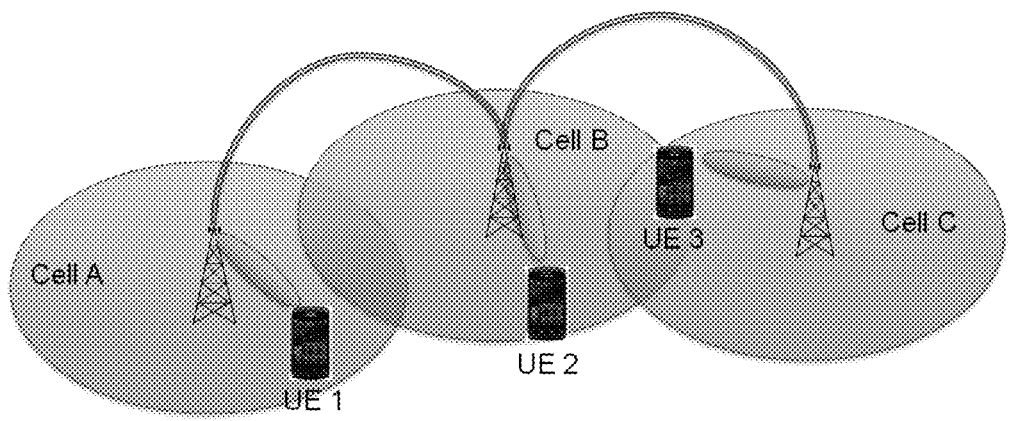
FIG. 8 is a diagram of an example of coordinated beamforming according to the prior art.

Coordinated beamforming (CB) is another form of downlink CoMP, an example of which is shown in FIG. 8. In CB, interfering cells are allowed to transmit to their cell edge UEs on a given set of time-frequency resources as long as the transmission beam to a given UE is chosen so as to minimize the interference to adjacent cell UEs. In the example shown in FIG. 8, neighboring cells labeled A, B, and C coordinate their beamforming vectors such that their respective UEs 1, 2, and 3 can be served simultaneously on a given set of time-frequency resources. Similar to CS schemes, CB also assumes that data for a given UE is only available at and transmitted from one cell. This scheme may require the UEs to feed back not only the channel state information (CSI) of their serving cell, but the CSI of other eNBs in the CoMP set. Furthermore, CB schemes also require dynamic coordination among multiple cells, which may require the backhaul link interconnecting the cells participating in CB to have low latency.

Figure 9:
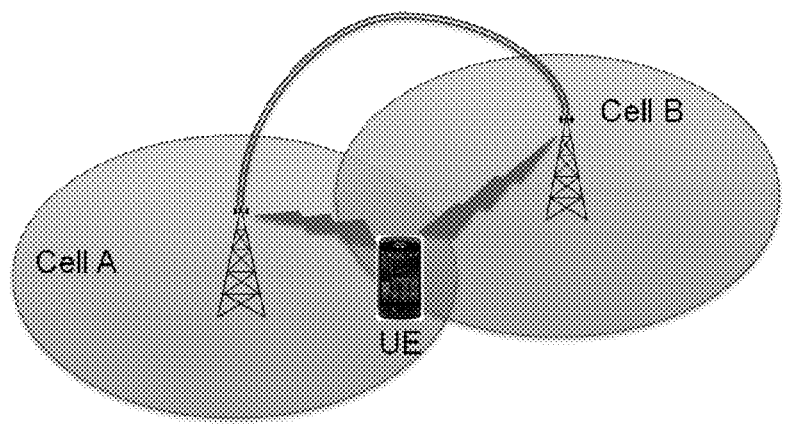
FIG. 9 is a diagram of an example of joint transmission according to the prior art.

A third form of downlink CoMP, known as joint transmission (JT), allows simultaneous transmission from multiple cells to one or more UEs in a given set of time-frequency resources. A simple example of JT is illustrated in FIG. 9. In this example, both cells A and B jointly transmit data to the UE. JT schemes generally require the backhaul link between the cells participating in joint transmission to have low latency. Additionally, the backhaul link may also need to have a high bandwidth, because JT involves data sharing between different cells.

It may be noted that when the downlink CoMP cooperating set involves multiple cells, it is possible to combine the CS/CB and JT schemes to form a hybrid downlink CoMP transmission.

Figure 10:
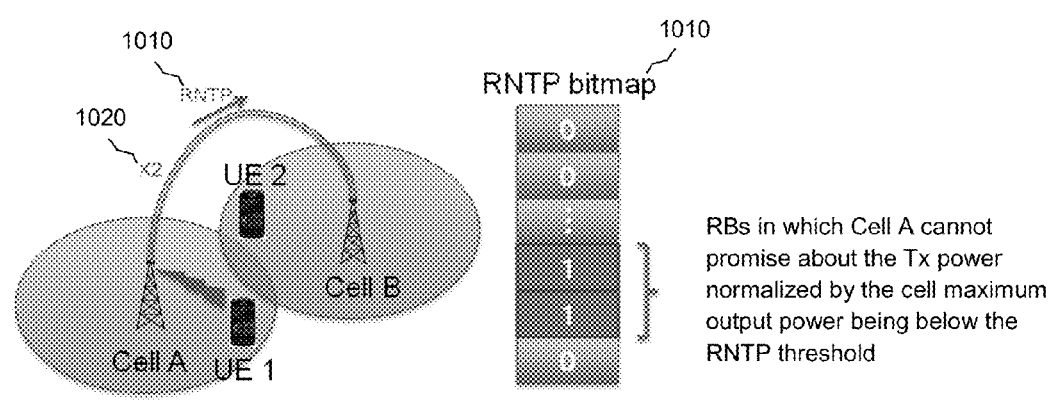
FIG. 10 is a diagram of an example of RNTP indication to adjacent cells according to the prior art.

The downlink CoMP schemes rely on dynamic coordination among the participating cells. In contrast, a scheme known as fractional frequency reuse (FFR), which uses a semi-statically exchanged relative narrowband transmit power (RNTP) bitmap, was introduced in LTE Release 8 to facilitate downlink frequency-domain inter-cell interference coordination (ICIC). As shown in FIG. 10, an RNTP bitmap 1010 is exchanged between neighboring cells over the X2 interface 1020. Each bit in the RNTP bitmap 1010 represents a resource block (RB) and is used to inform the neighboring cell whether or not the transmit power on that RB is below a certain threshold. For instance, in FIG. 10, cell A may transmit on high power to UE 1 on certain RBs. It is assumed that the high transmit power, once normalized by the maximum output power of cell A, may exceed the RNTP threshold. These RBs are indicated with a value of '1' on the RNTP bitmap 1010, which means that cell A can make 'no promise' about the normalized transmission power being below the RNTP threshold on these RBs. Then, the resulting RNTP bitmap 1010 is transmitted to cell B via the X2 interface 1020. On receiving the RNTP bitmap 1010, cell B may avoid scheduling UE 2, which is at the cell-edge of cell B, in those RBs where cell A is indicating an RNTP value of '1'. However, to allow some scheduling flexibility, the reaction of the receiving cell to an RNTP indication is not standardized. It may be noted that LTE allows the value of the power threshold and the time period over which a given RNTP indication is valid to be configurable. The RNTP indication-based ICIC scheme is focused toward avoiding interference and does not rely on the interference cancellation or suppression capabilities of advanced UE receivers.

Figure 11:
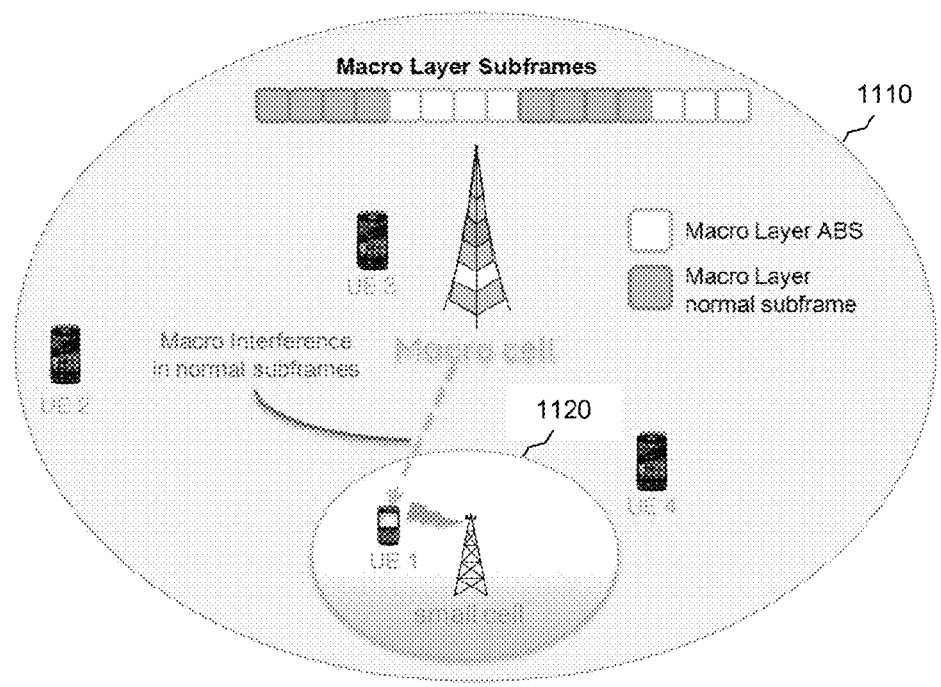
FIG. 11 is a diagram of an example of ABS-based eICIC according to the prior art.

The Rel-8 RNTP-based ICIC scheme enables inter-cell interference coordination in the frequency domain. With the deployment of co-channel heterogeneous networks, which consists of one or more small cells overlain within the coverage area of a macro cell, interference scenarios may arise that may require enhancements to the existing Rel-8 ICIC schemes. An example of an interference scenario between a macro cell and a small cell is illustrated in FIG. 11. In this scenario, a macro cell 1110 may cause interference to UE 1, which is assumed to be served by a small cell 1120 and in the cell range expansion (CRE) area of the small cell 1120. Particularly, the interference caused by the macro cell 1110 in normal subframes may significantly affect the control channel reception at UE 1. To circumvent this problem, time-domain based ICIC was introduced in LTE Release 10, which is also referred to as enhanced ICIC (eICIC). As part of eICIC, special subframes known as almost blank subframes (ABSs) were introduced. The ABSs are basically subframes where the macro cell 1110 reduces its transmission power or completely shuts off transmission, thus allowing the small cell 1120 the opportunity to schedule UE 1 during these special subframes. UE 1 may use a subset of the ABSs for radio resource measurements (RRM), radio link monitoring (RLM), and channel state information (CSI) measurements for the serving small cell 1120 and possibly for one or more neighboring small cells.

To ensure backward compatibility with Release 8/9 UEs, certain legacy signals or transmissions such as the primary synchronization signal (PSS), secondary synchronization signal (SSS), cell-specific reference signal (CRS), paging channel (PCH), and physical broadcast channel (PBCH) may need to be transmitted by the macro cell during an ABS. The ABS pattern may be configured by the macro cell and signaled to the small cell via the X2 interface. It may be noted that the ABS-based eICIC scheme is mainly applicable to scenarios where both the macro layer and the small cell layer operate on the same carrier frequency.

Neither CoMP, RNTP, nor ABS addresses the problem of joint inter-cell coordination and advanced interference cancellation or suppression. The downlink CoMP schemes may require the backhaul link interconnecting the coordinating cells to have low latency. However, in a heterogeneous scenario where one or more small cells are deployed with a high density in an area covered by an overlaying macro cell, the backhaul links interconnecting the small cells and the macro cell may involve notable latency. Hence, the downlink CoMP schemes may be unsuitable for a highly dense small cell scenario. The Release 8 RNTP-based ICIC scheme is focused toward interference avoidance and does not rely on the interference cancellation or suppression capabilities of advanced receivers. The ABS-based eICIC solution introduced in Release 10 of the LTE specifications is primarily applicable to the case where both the macro layer and the small cell layer operate on the same carrier frequency. Hence, the ABS solution may not be directly applied to the case where the small cell layer operates on an entirely different frequency band from the overlapping macro cell.

Since a small cell deployment may have a high density of small cells and may be deployed with little planning, there may be a large amount of overlap among the small cells' coverage areas. Such overlap may lead to strong inter-cell interference, which may degrade system performance. The interference mitigation techniques used in LTE Rel-11 and earlier releases mostly use transmitter coordination schemes to avoid generating interference at a UE receiver. On the other hand, when a UE receiver is equipped with multiple receiving antennas, the receiver may use an advanced receiver algorithm to suppress or cancel interference. As the previous interference coordination schemes may not fully use the receiver capability of a UE, using the latter approach has the potential to improve spectral efficiency over the case with complete interference avoidance in a densely deployed small cell scenario. It may be noted that the previous approaches may involve muting the interfering cells, reducing the transmission power on the interfering cells, or requiring more channel state information feedback.

As the receiver may obtain channel information more easily and accurately than the transmitter, using an advanced receiver to mitigate interference may have some advantages over schemes that rely on coordination purely between transmitters. For example, receiver-based interference mitigation may avoid complicated channel state information feedback corresponding to different transmission points involved in a typical pure coordinating approach. A significant improvement in link and system performance may be expected by using an advanced receiver to mitigate interference.

To suppress or cancel inter-cell interference by using an advanced receiver, some information about the interfering signal may need to be available to the receiver. For example, to employ a minimum mean square error—interference rejection combining (MMSE-IRC) receiver, the received interference covariance matrix or the channel matrix from the interferers may need to be known to the receiver.

The MMSE-IRC type advanced receiver was studied in Release 11. That study assumed the utilization of an MMSE-IRC receiver on the UE side without any system (i.e., network) assistance. To enable interference suppression for an MMSE-IRC receiver, an interference covariance matrix may need to be estimated. Several interference covariance matrix estimation methods were proposed and studied in Release 11.

In one studied method, the UE first uses reference signals, e.g., the CRS or the demodulation reference signal (DMRS), from the serving cell to estimate the channel from that cell and then removes the serving cell reference signal portion from the received signal. The residual signal is used as an interference signal, which in turn is used to estimate the interference covariance matrix.

Another method studied involves using PDSCH data symbols to estimate the covariance matrix of the overall received signal. The received signal covariance matrix is then used in the MMSE-IRC receiver to suppress the interference. In this method, no interference covariance matrix is needed.

An MMSE-IRC receiver using either of the above-mentioned interference measurement methods has shown performance gain over an LTE baseline MMSE receiver, with the first mentioned method yielding superior performance compared to the second mentioned method. However, in these methods it was assumed that there was no assistance from the network to support accurate estimation of the interference and the desired channels. As a result, the MMSE-IRC receiver performance gain for the above methods was limited.

Some examples of advanced linear receivers with interference suppression capability will now be discussed.

In an OFDM multiple input/multiple output (MIMO) system, the signal model at one RE may be presented as:

$$x = Hs + \sum_{i=1}^{p} H_i s_i + n$$

where x is the received signal vector on the multiple receive antennas, s is the transmitted desired signal vector, H is the channel for desired signal, $H_i$ and $s_i$ are the channel and transmitted signal for interferer i, respectively, and n is the additive noise, which is assumed to be spatially white.

If no interference-related information is known other than interference plus noise power, it may be assumed that interference plus noise is spatially white, and MMSE receiver may be used:

$$\hat{s} = H^H(HH^H + \sigma_{I+n}^2 I)^{-1} x$$

where $\sigma_{I+n}^2$ is interference plus noise power, and I is an identity matrix. For this type of receiver, the desired channel may need to be estimated. In addition to the desired channel, interference plus noise power may need to be estimated.

If the spatial statistics of the interference and the noise are known, an MMSE-IRC receiver may be used:

$$\hat{s} = H^H(HH^H + R_{I+n})^{-1} x$$

where $R_{I+n}$ is the interference plus noise covariance matrix. For this type of receiver, the desired channel may need to be estimated. In addition to the desired channel, the interference plus noise covariance matrix may need to be estimated.

If the spatial statistics of received total signal (the desired signal plus the interference and the noise) are known, another form of an MMSE-IRC receiver may be used:

$$\hat{s} = H^H (R_{d+I+n})^{-1} x$$

where $R_{d+I+n}$ is the desired signal plus interference plus noise covariance matrix. For this type of receiver, the desired channel may need to be estimated. In addition to the desired channel, the desired signal plus interference plus noise covariance matrix may need to be estimated.

If the deterministic interference channels and the power of the white noise are known, yet another form of an MMSE-IRC receiver may be used:

$$\hat{s} = H^H \left( HH^H + \sum_{i=1}^{p} H_i H_i^H + \sigma_n^2 I \right)^{-1} x$$

For this type of receiver, the desired channel from the serving cell may need to be estimated. In addition to the desired channel from the serving cell, interference channels and noise power may need to be estimated separately.

The channel state information of the interferers is typically needed for any of the above-mentioned advanced receivers to suppress interference.

If the macro cell layer and the small cell layer operate on the same frequency band, the macro cell may cause dominant interference to the cell-edge UEs associated with the small cell. Utilizing different frequency bands for the macro cell layer and the small cell layer may alleviate the dominant interference caused by the macro cell to the UEs attached to the small cells. However, when small cells are densely deployed, inter-cell interference between small cells may occur. One approach to handle this inter-cell interference is to perform radio resource coordination among the cells. Examples of this approach in the previous LTE releases include ICIC, eICIC, CS/CB, and dynamic point selection (DPS). These approaches rely on coordination between transmitters to avoid interference. For example, these approaches may involve muting the interfering cells, reducing the transmission power on the interfering cells, or requiring more channel state information feedback.

An alternative approach is to allow a well-controlled amount of interference between a selected set of adjacent small cells and rely on the interference cancellation or suppression capabilities of advanced UE receivers to mitigate this controlled interference. As the transmitter-based interference coordination schemes may not fully use the interference cancellation/suppression capabilities of a UE, using the joint transmitter-receiver-based approach has the potential to further improve spectral efficiency over the case with complete interference avoidance in a densely deployed small cell scenario.

With this background information in place, issues identified and addressed by the embodiments disclosed herein may now be described.

A scenario may be assumed herein in which multiple small cells are deployed in the coverage area of a macro cell. The small cells and the macro cell may be inter-connected through a backhaul. The macro cell may act as a centralized coordinator for all small cells under its coverage for the purposes of coordinating interference mitigation-related information.

The embodiments disclosed herein may also be applicable to other scenarios, for example, where one small cell acts as a coordinator, where small cells are deployed without macro cell coverage, in homogeneous deployment scenarios, in heterogeneous deployment scenarios, or in decentralized coordination schemes. It may also be noted that, although the discussion herein focuses on the downlink, the embodiments may also be applicable to uplink transmission. Also, when reference is made herein to an action being taken by a cell, it should be understood that the action may be taken by a component in the cell, such as an eNB.

The embodiments disclosed herein address the issue of joint inter-cell interference coordination and advanced interference cancellation or suppression. The embodiments also involve the issue of targeting improved spectral efficiencies over the 'interference avoidance' based approaches by co-scheduling neighboring cells' cell-edge UEs and relying on the advanced interference cancellation or suppression capabilities of the UEs to mitigate interference. The embodiments also take into account the fact that the backhaul links interconnecting one or more small cells and the overlaying macro cell may have notable latency, i.e., latency in the range of a few milliseconds to tens of milliseconds. However, the joint inter-cell interference coordination and advanced interference cancellation or suppression issues may also be applicable to cases where there is a low latency backhaul interconnecting the small cells and the overlaying macro cell. Hence, the embodiments disclosed herein may be relevant to various scenarios which include cases with or without the X2 interface between the small cells. The embodiments disclosed herein may also be relevant to other backhaul interfaces besides the X2 interface. Furthermore, the embodiments disclosed herein address downlink interference.

A concept of inter-cell resource sharing (ICRS) is disclosed herein in which some time-frequency resources are purposely shared between two or more adjacent cells serving UEs that are equipped with interference cancellation receivers. The shared resources may be coordinated among the participating cells by taking into account the UEs' interference cancellation capabilities, such as the number of data layers and interference layers the UEs' receivers can process. Some restrictions may be imposed on the allowed number of transmission layers for the serving cell and the maximum number of transmission layers possible (including the serving cell and the interfering cell transmission layers) over the shared resources. The coordination may be done either through a centralized entity or a distributed entity over the participating cells through message exchanges between them.

More specifically, the embodiments disclosed herein address the mitigation of inter-cell interference that UEs served by neighboring small cells experience over the shared resources in highly dense small cell deployments. As opposed to conventional approaches which rely on various means of interference avoidance, the embodiments disclosed herein introduce a mechanism in which neighboring cells are allowed to use the same resource (i.e., the same RB) to concurrently schedule their respective users. An RB that is used by neighboring small cells to concurrently schedule the cells' UEs may be referred to as a shared RB, and the process of sharing these resources may be referred to as inter-cell resource sharing (ICRS). It may be noted that a shared RB may carry a first signal from a first cell to a first UE and a second signal from a second cell to a second UE and that the first and second signals may carry different information. This may be contrasted with the scenario depicted in FIG. 9, where two cells may transmit signals on shared resources but may transmit substantially the same information on the signals to the same UE.

In order to handle inter-cell interference within the shared RB, the neighboring small cells may rely on the interference suppression or cancellation capabilities of UEs with advanced receivers. The neighboring small cells may schedule their UEs with advanced receiver capabilities within these shared RBs. It may be beneficial to schedule advanced receiver UEs that are near the cell edge in the shared RBs, as these UEs may be the most vulnerable to inter-cell interference, and interference suppression or cancellation may be used by these UEs to cancel this interference. However, such scheduling does not prevent one or more of the small cells from scheduling cell-center UEs in the shared RBs.

Since small cells using a shared RB to concurrently schedule cell-edge UEs may rely on advanced receiver techniques to cancel or suppress inter-cell interference, such a small cell may first need to send at least two pieces of information to the cell that configures the ICRS. First, the small cell may need to send the maximum number of transmission layers possible within the shared RB or RBs. This number is related to the capabilities of the UE receiver, i.e., the number of receive antennas at the UE. Second, the small cell may need to send the allowed number of transmission layers for the serving small cell within the shared RB or RBs.

The first item represents the sum of the allowed number of transmission layers of the serving small cell signal and the total number of transmission layers of the dominant interfering signals. The second item represents the number of transmission layers desirable for the serving small cell.

Once the configuring cell receives this information (and possibly other additional information), the configuring cell may configure the ICRS and may send the following information (and possibly other additional information) to the cells participating in ICRS. First, the configuring cell may send ICRS information, which may consist of a bitmap indicating which RBs are declared as shared RBs in the frequency domain and/or the time domain among the cell of interest and a number of neighboring cells. Second, the configuring cell may send the maximum number of transmission layers configured, which refers to the maximum number of transmission layers that could possibly be transmitted over the shared RB or RBs including layers from both the small cell of interest and the neighboring small cells. Third, the configuring cell may send the allowed number of transmission layers granted, which refers to the total number of transmission layers allowed for the small cell of interest. Fourth, the configuring cell may send the reference signal configurations, which may include the DMRS ports corresponding to the allowed number of transmission layers granted for the small cell of interest and possibly those granted for other neighboring cells over the shared RB. Fifth, if a maximum likelihood (ML) or successive interference cancellation (SIC) type of advanced receiver is used for interference cancellation, the symbol modulation format may optionally be conveyed to the neighboring small cells.

Once the small cells are configured with the ICRS information, the small cells may transmit PDSCH over the shared RBs and follow the above-mentioned transmission layer restrictions and reference signal configurations.

The embodiments disclosed herein introduce coordination-related signaling that may be required between multiple cells or eNBs in order for resources to be shared between the cells or eNBs and to configure ICRS. The coordination-related signals exchanged between the cells or eNBs may entail standard specification changes. Details of the reference signal design can be found in U.S. patent application Ser. No. 13/773,408, entitled "Methods of Interference Measurement for Advanced Receiver in LTE/LTE-A", filed Feb. 21, 2013, which is incorporated herein by reference.

Three sets of embodiments, which may stand alone or may be used in various combinations with one another, are disclosed herein. The first set of embodiments is directed toward centralized ICRS coordination. The second set of embodiments is directed toward decentralized ICRS with master coordinator selection. The third set of embodiments is directed toward a fully decentralized ICRS with one-shot message exchange.

In the first set of embodiments, signaling messages for configuring ICRS are provided for cases where an overlaying macro cell has RNTP information associated with the small cells under the macro cell's coverage area. These embodiments may also be applicable to cases where there may be no backhaul connection interconnecting neighboring small cells, but there may exist backhaul links interconnecting the small cells to the macro cell. Additionally, signaling messages for configuring ICRS are provided for cases where an overlaying macro cell does not have RNTP information associated with the small cells under the macro cell's coverage area.

Figure 12:
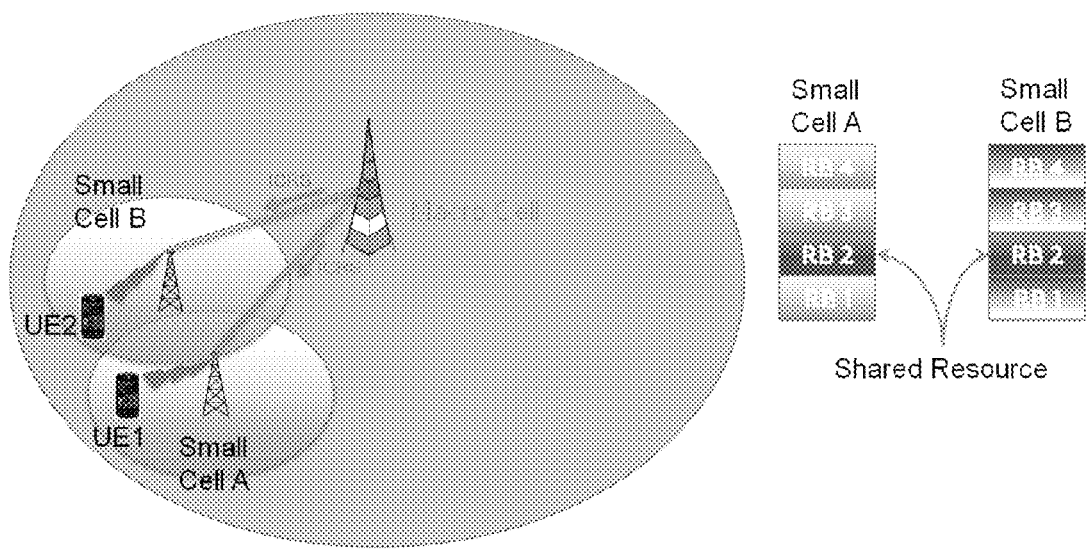
FIG. 12 is a diagram of inter-cell resource sharing (ICRS), according to an embodiment of the disclosure.

The concept of inter-cell resource sharing (ICRS) for the case with a centralized coordinator is illustrated in FIG. 12. For the sake of clarity in the drawing, only two small cells are shown, but additional cells may be present. FIG. 12 may represent a case where the macro cell layer and the small cell layer operate on different frequency bands.

In a scenario where small cells are deployed with high density under the coverage area of an overlaying macro cell, the macro cell may serve as the centralized coordinator and configure and/or signal ICRS information to the small cells via the backhaul link interconnecting the macro cell and the small cells. The configuration of ICRS may be done semi-statically and may allow certain RBs to be shared among UEs of neighboring small cells. Using the ICRS information, neighboring small cells that received an ICRS configuration from the macro cell may concurrently schedule their UEs, including their cell-edge UEs, in the shared RBs indicated in the ICRS. The scheduled UEs may then use advanced receivers to cancel or suppress inter-cell interference on the shared RBs. In the example of FIG. 12, a macro cell configures the ICRS information for small cells A and B. The ICRS information may specify which RBs are to be shared by small cells A and B. The macro cell then signals the ICRS information to each small cell via the backhaul links. The configuration may be done semi-statically. According to the ICRS information in this example, small cells A and B are allowed to share RB #2, which they use to concurrently schedule their respective cell-edge UEs 1 and 2. UEs 1 and 2 then utilize advanced receiver techniques to cancel or suppress the inter-cell interference emanating from a neighboring small cell. If either small cell A or small cell B schedules cell-center UEs in the shared RBs, and if the cell-center UEs sense no severe interference, then advanced receivers may not be needed at the cell-center UEs.

Since small cells using a shared RB to concurrently schedule their UEs may rely on advanced receiver techniques to cancel or suppress inter-cell interference, the configuration of ICRS may depend on one or more of two factors. A first factor is the maximum number of transmission layers possibly being transmitted within the shared RB or RBs. This number may be related to a UE's receiver capabilities, i.e., the number of receive antennas on the UE. A second factor is the allowed number of transmission layers for the small cell of interest within the shared RB or RBs.

These factors may determine the interference rejection capability of UEs that employ advanced interference cancellation or suppression techniques. Generally, the maximum number of transmission layers possible (i.e., the sum of the allowed number of transmission layers of the serving cell signal and the total number of transmission layers of the dominant interfering signals) should not exceed the number of receive antennas at the UE in order for interference cancellation or suppression to be effective. That is, there should be sufficient degrees of freedom at the receiver for interference cancellation or suppression.

Figure 13:
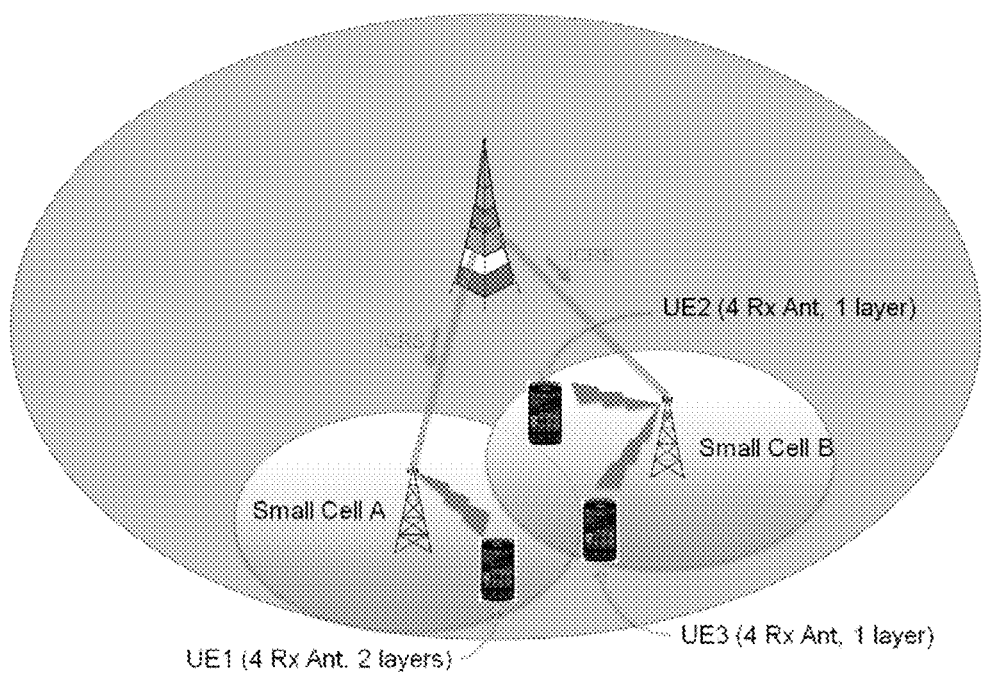
FIG. 13 is a diagram of an example of an allowed number of transmission layer coordination via ICRS signaling, according to an embodiment of the disclosure.

An example of the coordination of an allowed number of transmission layers via ICRS signaling is shown in FIG. 13. In this example, small cells A and B both have an allowed number of transmission layers of two when the macro cell configures and signals the ICRS information. The maximum number of transmission layers in this example may be four. Small cell A schedules cell-edge UE 1 in the shared RB or RBs with two transmission layers. Small cell B schedules cell-edge UEs 2 and 3 on the same RBs with one transmission layer. That is, the allowed number of transmission layers is two for small cell B as well. Since each of the three UEs is equipped with four receive antennas and the number of interfering transmission layers is either two or three, each of the three UEs has enough degrees of freedom to effectively cancel or suppress the interference.

In an embodiment, the ICRS information may also contain instructions on which type of UE is to be scheduled in the shared RBs. That is, the ICRS information may specify whether cell-edge UEs or cell-center UEs should be scheduled in the shared RBs. Such instructions may further help reduce the effect of interference on UEs in adjacent small cells.

When configuring the ICRS information, the overlaying macro cell may take into account the availability of downlink frequency domain ICIC or RNTP information corresponding to the small cells under the macro cell's coverage. However, such information may not always be available at the macro cell in a scenario where the small cells operate on an entirely different frequency band from the overlaying macro cell (i.e., the inter-frequency case). For instance, according to 3GPP TS 36.243, the RNTP IE is sent from one eNB to another eNB through the X2 link, which controls intra-frequency neighboring cells. Since the discussion herein of ICRS with a centralized coordinator deals primarily with the inter-frequency case, the following discussion describes ICRS coordination by the macro cell under two different scenarios. In a first scenario, the macro cell has RNTP information, which is part of the LOAD INFORMATION message, for small cells under the macro cell's coverage. In a second scenario, the macro cell does not have RNTP information for small cells under the macro cell's coverage.

Figure 14:
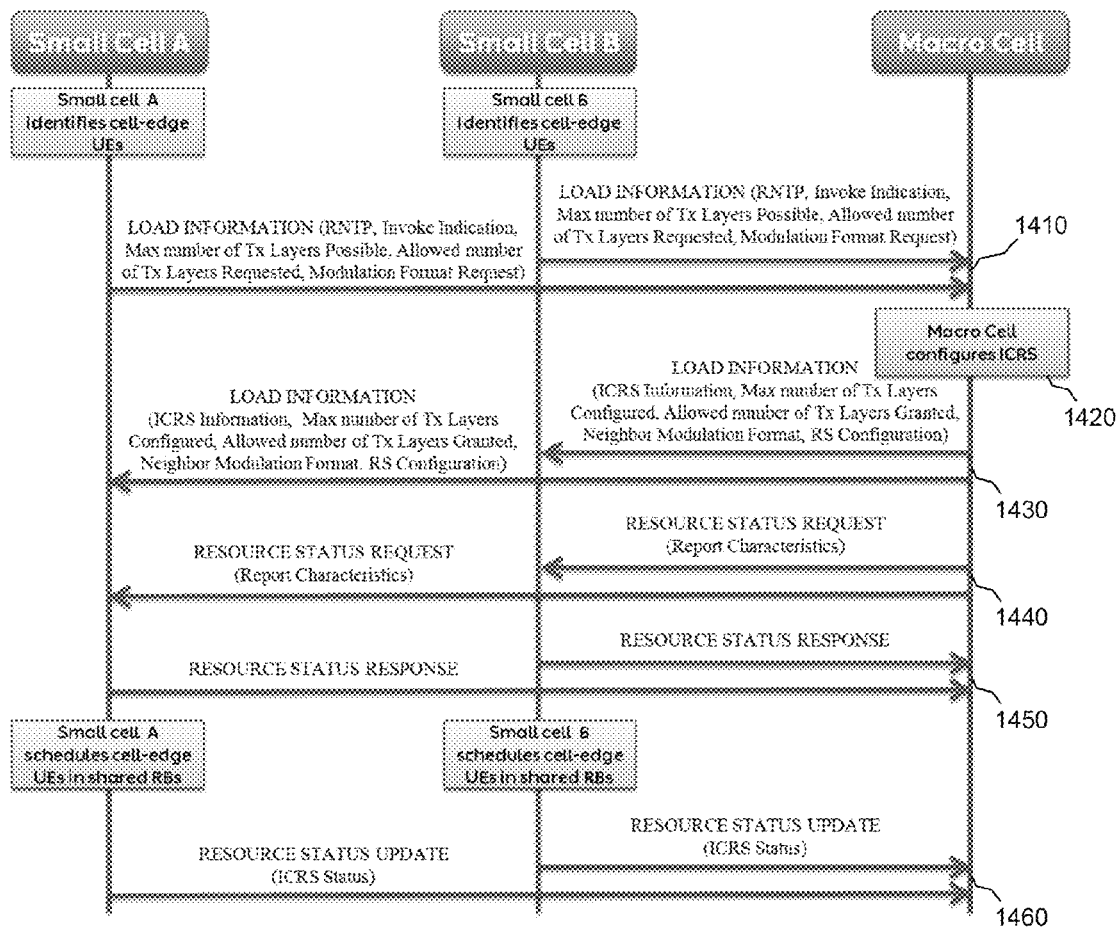
FIG. 14 is a diagram of a typical ICRS information exchange, according to an embodiment of the disclosure.

FIG. 14 shows typical signaling messages in the case where an overlaying macro cell has RNTP information corresponding to the small cells under the macro cell's coverage area. Only two small cells are shown in FIG. 14, but the signaling mechanism described in the figure may be extended to a larger number of small cells deployed under an overlaying macro cell. If there are more than two small cells, each small cell may convey the same information as the two small cells shown in the example. The macro cell, which is the coordinator, may need to perform the coordination based on information from all the small cells.

The coordination procedure begins with the small cells identifying cell-edge UEs using one of two approaches. In a first approach, using the reference signal received power (RSRP) and/or the reference signal received quality (RSRQ) measurement reports from the UEs attached to a small cell, the small cell may determine a rough estimate of the path loss values associated with the small cell and the UEs. These path loss values may be used to categorize the UEs as cell-edge UEs or cell-center UEs. A second option is to utilize the power headroom for UEs that report power headroom to the small cell. The small cell may obtain the approximate downlink path loss from the power headroom reports and use the path loss information to determine which UEs may need to be configured for RSRP reporting.

Then, the small cells may determine their RNTP bitmaps by taking into account how the small cells handle the scheduling of cell-edge UEs. The small cells may then send the determined RNTP bitmaps as part of the LOAD INFORMATION message over the backhaul interface, such as X2 link, to the overlaying macro cell. The LOAD INFORMATION message from the small cells may also include the Invoke Indication IE with its value set to "ICRS Information". By setting the Invoke Indication IE value to "ICRS Information", the small cells let the overlaying macro cell know that the UEs served by the small cells have interference cancellation capabilities and that the small cells can share some bandwidth (PRBs) with neighbor cells with high-power transmission. That is, the existing Invoke Indication IE may be given a new value that indicates that a small cell is capable of performing interference mitigation and that the small cell wishes to be configured to do so. The new value for the Invoke Indication IE may be one or more bits, a string, or some other type of indicator. Setting such an indicator to an appropriate value may be referred to as setting the Invoke Indication IE value to "ICRS Information".

When the Invoke Indication IE value is set to "ICRS Information", the macro cell may be requested to configure ICRS and send the configuration information back to the small cells. A small cell may also include one or more of three factors as part of the LOAD INFORMATION message, either within an existing IE or in a new IE. A first factor is the maximum number of transmission layers possible within a given small cell in the shared RBs. This number may be related to a UE's receiver capabilities, i.e., the number of receive antennas at the UE. A second factor is the allowed number of transmission layers requested by a given small cell to be used in shared RBs. A third, optional, factor is a modulation format requested to be used by a given small cell within shared RBs.

The first two factors may help the macro cell in determining the appropriate allowed number of transmission layers for each small cell while ensuring that enough degrees of freedom are available at the UEs with advanced receivers to perform interference suppression or cancellation within the shared RBs. The third factor may let a small cell request a preferred modulation format to be used within the shared RBs for the purpose of enabling interference cancellation receivers, such as SIC receivers, within the shared RBs. The third factor may be optional and may not be needed if interference cancellation receivers, such as SIC receivers, are not to be employed in the shared RBs. These factors may be signaled on a per RB basis (i.e., one value per RB) or on a per RB group basis (i.e., one value per a group of RBs). For the factors related to transmission layers, a two-bit value may be used to signal one to four transmission layers. For the modulation factor, one or two bits may be used to signal two or four orders of modulation.

As shown in FIG. 14, once the overlaying macro cell, at event 1410, receives the initial LOAD INFORMATION messages from the small cells under its coverage area, the macro cell, at event 1420, configures the ICRS information. The ICRS information may consist of a bitmap indicating which RBs are declared as shared RBs in the frequency domain.

Each bit in the frequency domain bitmap may represent an RB, and a value of '1' may mean that the corresponding RB is declared as a shared RB. Alternatively, the macro cell may allocate a set of RBs as shared RBs when configuring ICRS information. However, some benefits such as frequency selective scheduling (FSS) and diversity gain may be adversely affected in such an approach. To alleviate this, the shared RBs may be allocated in a distributed fashion. That is, the shared RBs may be spread across the entire system bandwidth in order to take advantage of FSS and diversity gain.

Figure 15:
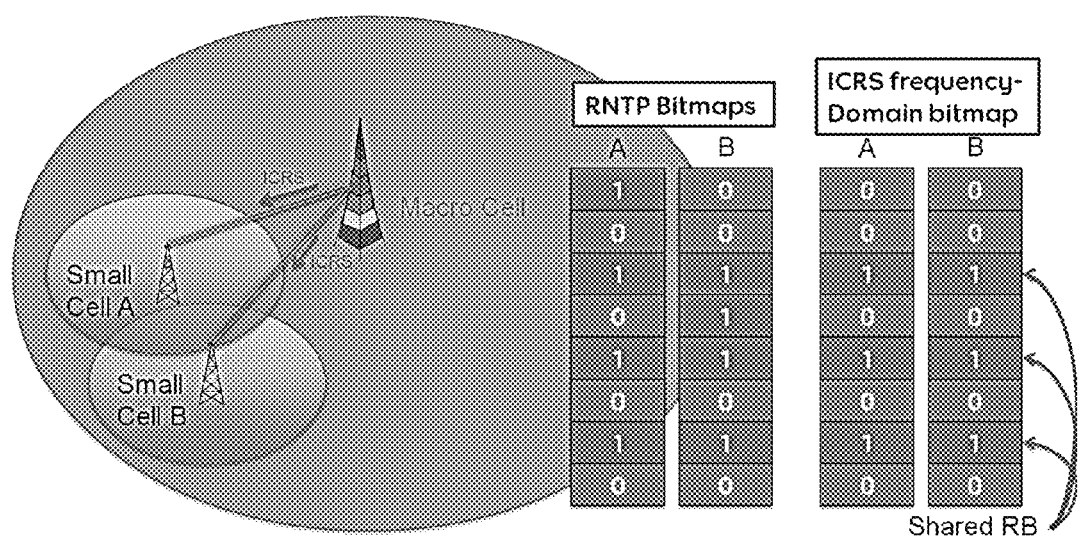
FIG. 15 is a diagram of an example of determining shared RBs, according to an embodiment of the disclosure.

If RNTP information corresponding to the small cells is available at the overlaying macro cell, the macro cell may select a subset of RBs with an RNTP value of '1' in neighboring small cells and declare those RBs as shared RBs for the neighboring small cells. An example illustrating this is shown in FIG. 15. It can be seen that in RNTP bitmap A, starting from the top, the first, third, fifth, and seventh RBs are available for sharing and that in RNTP bitmap B, the third, fifth, and seventh RBs are available for sharing. Since the third, fifth, and seventh RBs are available for sharing in both cell A and cell B, those RBs may be designated as shared RBs.

Additionally, in the time domain, the ICRS information sent from the macro cell to the small cells, as shown in FIG. 14, may include a bitmap that indicates the subframes in a sequence of subframes to which the ICRS information is applicable. If such a time domain bitmap is included in the ICRS information, the small cell may apply the frequency domain bitmap only to those subframes that correspond to a value of '1' in the time domain bitmap. If a time domain bitmap is included, the bitmap may indicate a pattern of subframes that will repeat itself periodically. Alternatively, the time domain ICRS information may consist of the signaling of a starting subframe and an ending subframe. In such a case, the ICRS configuration may apply in the time period between the starting subframe and the ending subframe. If a time domain bitmap is included in the ICRS information, then the ICRS scheme may perform both frequency and time domain interference coordination.

As shown in FIG. 14, the macro cell, at event 1430, sends the small cells a LOAD INFORMATION message through a backhaul link, such as the X2 link. The LOAD INFORMATION message may include the configured ICRS information along with, for example, the maximum number of transmission layers configured, the allowed number of transmission layers granted, reference signal configurations, and possibly other coordination information. The maximum number of transmission layers configured may refer to the maximum number of transmission layers possible within the shared RB or RBs in both the small cell of interest and the neighboring small cells. The allowed number of transmission layers granted may refer to the total number of transmission layers allowed for the small cell of interest. For example, in a case where a single RB is shared between two neighboring small cells, if the maximum number of transmission layers configured in the shared RB is four, then both the small cells may be granted an allowed number of transmission layers of two. Alternatively, one small cell may be granted an allowed number of transmission layers of three and the other small cell may be granted an allowed number of transmission layers of one. In some embodiments, information about the list or cell identifiers (IDs) of small cells sharing a given set of shared RBs may also be included as part of the LOAD INFORMATION message from the macro cell to the small cells. The information in the LOAD INFORMATION message may be signaled on a per RB basis (i.e., one value per RB) or on a per RB group basis (i.e., one value per a group of RBs).

The reference signal configurations sent to the small cells as part of the LOAD INFORMATION message may include the DMRS ports corresponding to the allowed number of transmission layers granted for the small cells within the shared RB or RBs. For instance, if a particular small cell is granted an allowed number of transmission layers of two within a shared RB, then two DMRS ports may be assigned to the small cell to be used within the shared RB. Furthermore, for the purposes of improved desired link channel estimation and accurate interference measurement, it may be desirable to make the DMRS ports assigned to neighboring cells orthogonal. In this case, the reference signal configuration, which is part of the LOAD INFORMATION message, may also include a virtual cell ID and a common scrambling ID to be applied within the shared RBs. The details of such a reference signal design can be found in U.S. patent application Ser. No. 13/773,408.

Additionally, if interference cancellation receivers, such as SIC receivers, are to be used in the shared RBs, then the macro cell may also include a neighboring small cell's modulation format on those shared RBs as part of the LOAD INFORMATION message. A small cell may assume that a neighboring small cell's modulation format on the shared RBs does not change until a new LOAD INFORMATION message with new ICRS information is received from the macro cell. The neighboring small cell modulation format is optional and may not be included in the macro cell's LOAD INFORMATION message if interference cancellation receivers, such as SIC receivers, are not to be employed in the shared RBs. If the neighboring small cell's modulation format is included as part of LOAD INFORMATION message, then the serving small cell may indicate this information to the UE scheduled on the shared RBs via dedicated radio resource control (RRC) signaling.

As shown in FIG. 14, after the ICRS-related information is sent to the small cells at event 1430, the overlaying macro cell, at event 1440, may send a RESOURCE STATUS REQUEST message, wherein an appropriate bit in the Resource Characteristics IE is set to '1' in order to request status reports on the usage of ICRS-shared RBs in the small cells. The small cells configured with the shared RBs may then respond, at event 1450, with RESOURCE STATUS RESPONSE messages to the macro cell. When this is complete, the small cells may periodically send, at event 1460, RESOURCE STATUS UPDATE messages which include ICRS status reports. An ICRS status report contained within a RESOURCE STATUS UPDATE message may indicate to the macro cell the percentage of shared RBs currently being used to schedule UEs and statistics of the actual number of transmission layers used within the shared RBs. These periodic ICRS status reports may assist the macro cell in determining whether the number of shared RBs needs to be increased or decreased. If the ICRS information or other accompanying coordination information (such as the maximum number of transmission layers configured, the allowed number of transmission layers granted, the reference signal configuration, etc.) needs to be changed, the coordinating macro cell may send a new LOAD INFORMATION message to the small cells in order to reconfigure the ICRS information.

Figure 16:
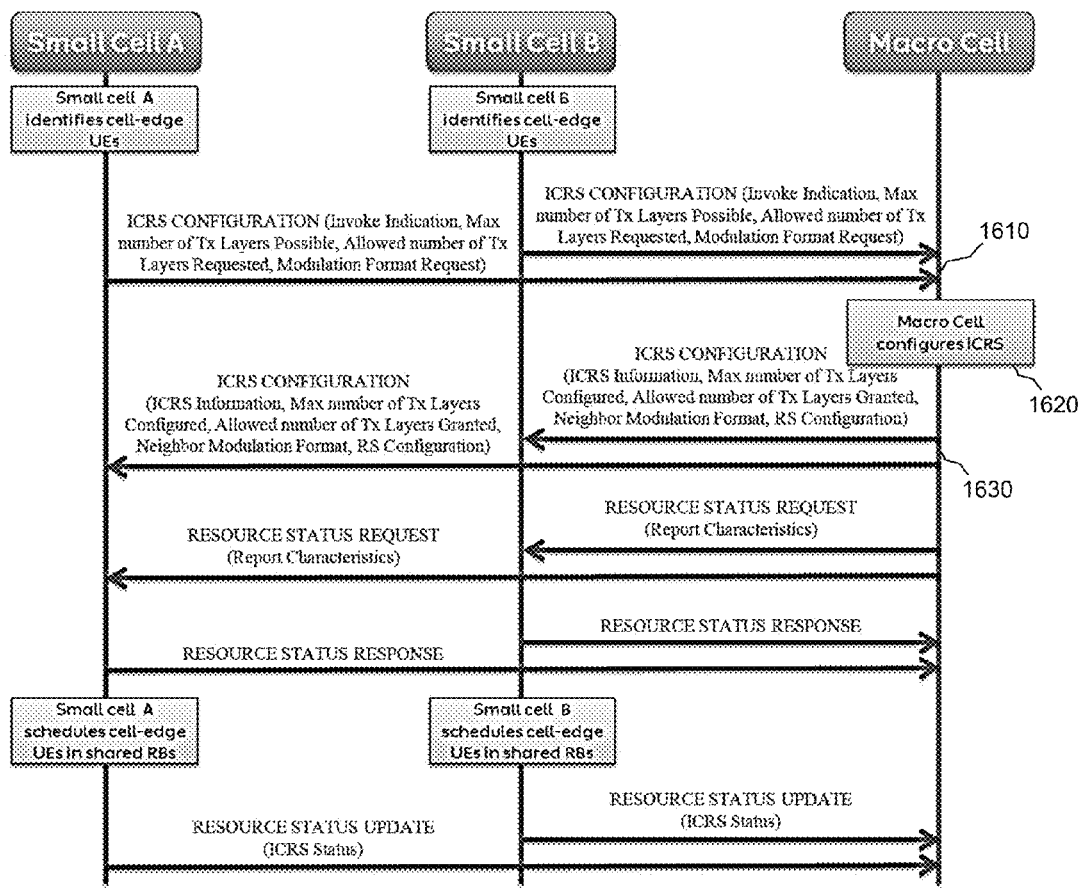
FIG. 16 is a diagram of a typical ICRS information exchange, according to an embodiment of the disclosure.

FIG. 16 shows typical signaling messages in the case where the overlaying macro cell does not have RNTP information corresponding to the small cells under the macro cell's coverage area. Only two small cells are shown in FIG. 16, but the signaling mechanism described in the figure may be extended to a larger number of small cells deployed under an overlaying macro cell.

It may be noted that the signaling shown in FIG. 16 is similar to the signaling shown in FIG. 14. A major difference between FIG. 16 and FIG. 14 is that in FIG. 16 the small cells, at event 1610, initially send a new message called "ICRS CONFIGURATION" instead of the LOAD INFORMATION message that exists in the LTE/LTE-A specifications. As shown in FIG. 16, the initial ICRS CONFIGURATION messages from small cells to the overlaying macro cell may include one or more of three factors. A first factor is the maximum number of transmission layers possible within a given small cell in the shared RBs. This number may be related to a UE's receiver capabilities, i.e., the number of receive antennas at the UE. A second factor is the allowed number of transmission layers requested by a given small cell to be used in shared RBs. A third factor is a modulation format requested to be used by a given small cell within shared RBs. Details regarding these factors may be found in the discussion above regarding similar factors transmitted in the LOAD INFORMATION message.

Since the RNTP information is missing in the initial ICRS CONFIGURATION message sent from the small cells to the overlaying macro cell, the macro cell, at event 1620, may configure the ICRS information based on the 'Maximum number of transmission layers possible' and the 'Allowed number of transmission layers requested'. The macro cell, at event 1630, sends an ICRS CONFIGURATION message to the small cells through a backhaul link, such as the X2 link. The ICRS CONFIGURATION message may include the configured ICRS information along with, for example, the maximum number of transmission layers configured, the allowed number of transmission layers granted, reference signal configurations, and possibly other coordination information such as information about the list or the cell IDs of small cells sharing a given set of shared RBs. This information may be signaled on a per RB basis (i.e., one value per RB) or on a per RB group basis (i.e., one value per a group of RBs). The reference signal configurations may include the DMRS ports corresponding to the allowed number of transmission layers granted for the small cell of interest within the shared RB or RBs. In this case, the reference signal configuration, which is part of the ICRS CONFIGURATION message, may also include a virtual cell ID and a common scrambling ID to be applied within the shared RBs. The details of such a reference signal design can be found in U.S. patent application Ser. No. 13/773,408.

The RESOURCE STATUS REQUEST, RESOURCE STATUS RESPONSE, and RESOURCE STATUS UPDATE messages for the scenario shown in FIG. 16 are similar to the corresponding messages shown in FIG. 14.

In addition to the centralized ICRS coordination cases just described, the disclosed ICRS scheme may also be utilized in scenarios where a macro cell is connected to a number of remote radio heads via a backhaul link with low latency. In such cases, the full set or a subset of the ICRS information may be configured and signaled to the remote radio heads by the macro cell.

The second and third sets of embodiments disclosed herein are directed toward ICRS for cases without a centralized coordinator. In a deployment scenario where a cluster of small cells are deployed in one frequency band outside the coverage area of an overlaying macro cell, decentralized versions of the ICRS scheme may be useful since there is no overlaying macro cell to perform centralized ICRS configuration. Two decentralized ICRS configuration schemes are disclosed herein. In one decentralized scheme, one of the constituent small cells of a small cell cluster becomes a master coordinator node by negotiating ICRS coordinator request and response messages with its neighboring cells. In a fully decentralized scheme, each small cell sends a one-shot message containing ICRS-related information to its neighboring cells.

The second set of embodiments is directed toward decentralized ICRS with master coordinator selection via negotiation. That is, a decentralized scheme is disclosed wherein one of the constituent small cells of a small cell cluster becomes a master coordinator node by negotiating ICRS coordinator request and response messages with its neighboring cells. A given small cell may serve as the master coordinator for a given period of time, and the role of master coordinator may change between different small cells from time to time. A change in master coordinator may be based on the number of cell-edge UEs with advanced receiver capabilities in the small cells or on other factors.

Figure 17:
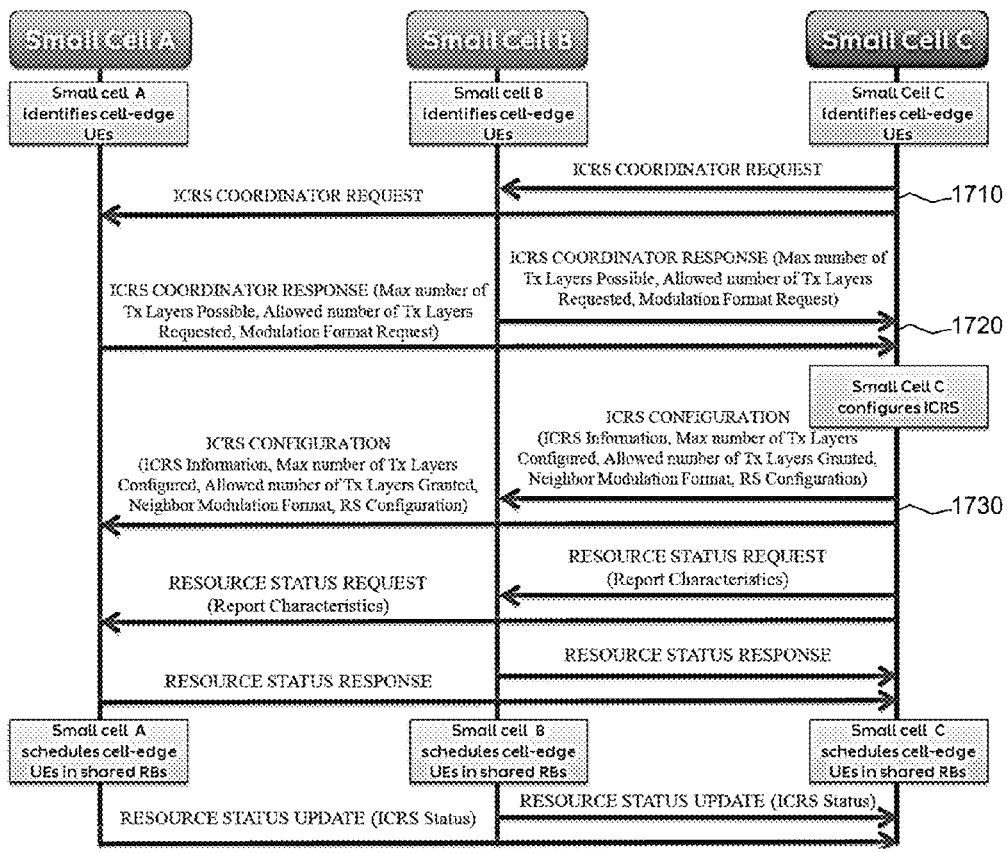
FIG. 17 is a diagram of another typical ICRS information exchange, according to an embodiment of the disclosure.

FIG. 17 shows typical signaling messages in the case where decentralized ICRS configuration is performed by a master coordinator selected via negotiation. The signaling messages shown in FIG. 17 differ from those in FIG. 14 and FIG. 16 at least in part due to the inclusion of the ICRS COORDINATOR REQUEST message at event 1710 and the ICRS COORDINATOR RESPONSE message at event 1720. In the example of FIG. 17, small cell C sends ICRS COORDINATOR REQUEST messages indicating that small cell C would like to become the master coordinator for configuring ICRS information. The decision to become a master coordinator may be based on the number of cell-edge UEs with advanced receiver capabilities in small cell C. The cell ID of small cell C may be included as part of the ICRS COORDINATOR REQUEST messages. After the ICRS COORDINATOR REQUEST messages are sent to the neighboring small cells A and B, the neighboring small cells A and B respond to the request from small cell C. If the request from small cell C is acceptable to small cells A and B, small cells A and B respond with ICRS COORDINATOR RESPONSE messages to small cell C. An ICRS COORDINATOR RESPONSE message may include one or more of three items of information. A first item is the maximum number of transmission layers possible within a given small cell in the shared RBs. This number may be related to a UE's receiver capabilities, i.e., the number of receive antennas at the UE. A second item is the allowed number of transmission layers requested by a given small cell to be used in shared RBs. A third item is a modulation format requested to be used by a given small cell within shared RBs.

Small cell C then may use these items of information along with RNTP information, if available, from small cells A and B to configure the ICRS information. The ICRS information may follow the general frequency-time configurations discussed with regard to ICRS with a centralized coordinator. In some embodiments, information about the list or cell IDs of small cells sharing a given set of shared RBs may also be included as part of the ICRS CONFIGURATION message from a small cell to a coordinating small cell.

In FIG. 17, at event 1730, small cell C sends an ICRS CONFIGURATION message through a backhaul link, such as the X2 link. The ICRS CONFIGURATION message may include the configured ICRS information along with, for example, the maximum number of transmission layers configured, the allowed number of transmission layers granted, reference signal configurations, and possibly other coordination information such as information about the list or the cell IDs of small cells sharing a given set of shared RBs. This information may be signaled on a per RB basis (i.e., one value per RB) or on a per RB group basis (i.e., one value per a group of RBs). The reference signal configurations may include the DMRS ports corresponding to the allowed number of transmission layers granted for the small cell of interest within the shared RB or RBs. In this case, the reference signal configuration, which is part of the ICRS CONFIGURATION message, may also include a virtual cell ID and a common scrambling ID to be applied within the shared RBs. The details of such a reference signal design can be found in U.S. patent application Ser. No. 13/773,408. The remaining signaling mechanisms in FIG. 17 are similar to the corresponding mechanisms presented in FIG. 14 and FIG. 16.

If the request from small cell C is not acceptable to either small cell A or small cell B, one or both of small cells A and B may send an ICRS COORDINATOR FAILURE message back to small cell C. The cause for the failure may be included as part of the ICRS COORDINATOR FAILURE message in a Cause IE. The Cause IE may be set to a value such as "Conflicts in ICRS coordinator requests". Such a conflict resolution step may be useful in the case where two small cells send an ICRS COORDINATOR REQUEST message to each other and/or to a third small cell.

In another embodiment, the master coordinator small cell may be statically or semi-statically configured through operations and maintenance (OAM). The status of the master coordinator small cell may be indicated in the messages the master coordinator small cell sends out to neighbor cells. In yet another embodiment, the ICRS function of the master coordinator may reside in a separate networking device, such as in a small cell gateway, if such a device is present.

The third set of embodiments is directed toward a fully decentralized ICRS scheme, wherein each small cell in a cluster sends a one-shot message containing ICRS-related information to its neighboring cells. In this scheme, a cluster of small cells may operate in one frequency band and outside a macro cell's coverage area. A small cell belonging to such a cluster may send ICRS-related information along with RNTP information to the small cell's neighboring cells through a backhaul link, such as the X2 link. The ICRS-related information may consist of one or more of four items of information. A first item is the maximum number of transmission layers a UE receiver in the small cell can handle. This number may be the sum of the desired transmission layers corresponding to the serving small cell and the interfering transmission layers. The transmission layers may be signaled in RBs with a value of '1' in the RNTP IE. A second item is the allowed number of transmission layers requested for the serving small cell signal in the RBs signaled with a value of '1' in the RNTP IE. A third item is the reference signal configurations requested for desired signal demodulation and interference measurement. A fourth item is the modulation format requested to be used by a given small cell within shared RBs.

These information items may be contained in a LOAD INFORMATION message sent to the neighboring small cells. In this case, the RBs to be shared may be a subset of the RBs signaled with a value of '1' in the RNTP IE. The neighboring small cells may use this information to decide whether or not to participate in the resource sharing process with the small cell that initially sent the ICRS-related information (along with RNTP information). In one example, a neighboring small cell that receives such a LOAD INFORMATION message may reply with a bitmap of resources that neighboring small cell suggests for sharing and other information such as the maximum number of transmission layers, the allowed number of transmission layers for the receiving small cell, and suggested reference signal configurations for the receiving small cell.

In another example, when a neighbor small cell receives the ICRS message, the neighbor small cell may take the following steps. First, the neighbor small cell may evaluate whether there is enough bandwidth to avoid scheduling cell-edge UEs in those RBs indicated by an RNTP with a value of '1'. Second, if the answer is yes, then the small cell may schedule its cell-edge UEs in different RBs and indicate this by RNTP in the small cell's LOAD INFORMATION message sent to other small cells. Third, if it is difficult to avoid the RBs and some of the small cell's cell-edge UEs have interference cancellation capabilities, the small cell may try to participate in the sharing on some of the RBs. That is, for a given cell-edge UE, the small cell may estimate the maximum number of transmission layers that the UE is able to receive when a neighbor cell also schedules cell-edge UEs in the same RBs. The estimate may be done by taking into account the UE's capabilities and the total number of transmission layers that may be scheduled by the neighbor cells. For example, if the UE has four receive antennas and the maximum number of transmission layers associated with the neighbor cells is two, then a layer 1 transmission may be used for scheduling data to the UE in the shared RBs. The small cell may send an ICRS message to its neighbor cells to inform the neighbor cells about the small cell's suggested RBs, the maximum number of transmission layers possible, and the allowed number of transmission layers the small cell may use over the shared RBs. The maximum number of transmission layers possible may be the same as or different from that indicated by the neighbor cells. Fourth, if none of the small cell's cell-edge UEs has any interference capabilities, then the small cell may decide not to participate in the sharing, and a normal LOAD INFORMATION message may be used.

After a number of rounds of such message exchanges, the small cells may negotiate and settle on a set of mutually acceptable configurations on the high-power RBs, the maximum number of transmission layers possible, and the allowed number of transmission layers.

The ICRS schemes disclosed herein efficiently address the problem of joint inter-cell coordination and advanced interference cancellation or suppression. Unlike previously discussed schemes, the disclosed schemes do not require a low latency backhaul link interconnecting the coordinating cells. This may be advantageous in highly dense small cell scenarios where the backhaul links interconnecting the small cells and the macro cell may involve notable latency. Furthermore, since the disclosed schemes allow some well-controlled interference between a selected set of adjacent small cells, the schemes enable the exploitation of the interference cancellation or suppression capabilities of advanced UE receivers. Additionally, the disclosed schemes allow the coordinating cells to exchange information that may be required for the utilization of advanced UE receivers.

Figure 18:
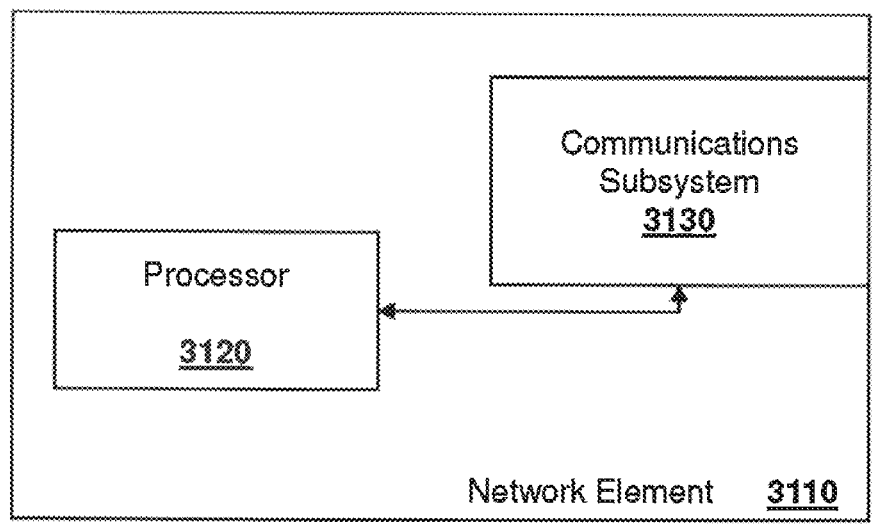
FIG. 18 is a simplified block diagram of an exemplary network element according to one embodiment.

The above may be implemented by a network element. A simplified network element is shown with regard to FIG. 18. In the figure, network element 3110 includes a processor 3120 and a communications subsystem 3130, where the processor 3120 and communications subsystem 3130 cooperate to perform the methods described above.

Figure 19:
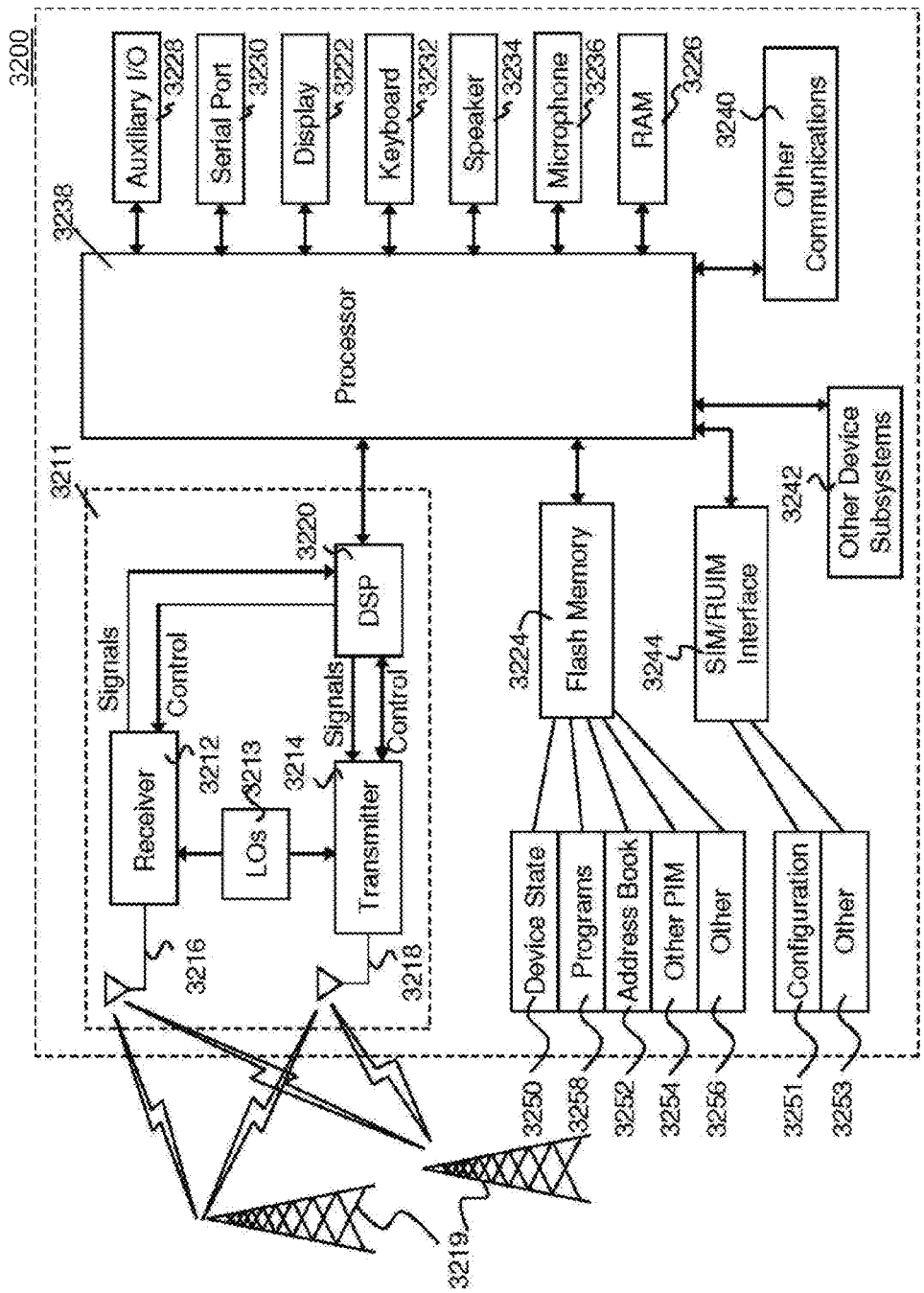
FIG. 19 is a block diagram with an example user equipment capable of being used with the systems and methods in the embodiments described herein.

Further, the above may be implemented by a UE. One exemplary device is described below with regard to FIG. 19. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219. As illustrated in the figure, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in the figure perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

The UE and other components described above might include a processing component that is capable of executing instructions related to the actions described above.

Figure 20:
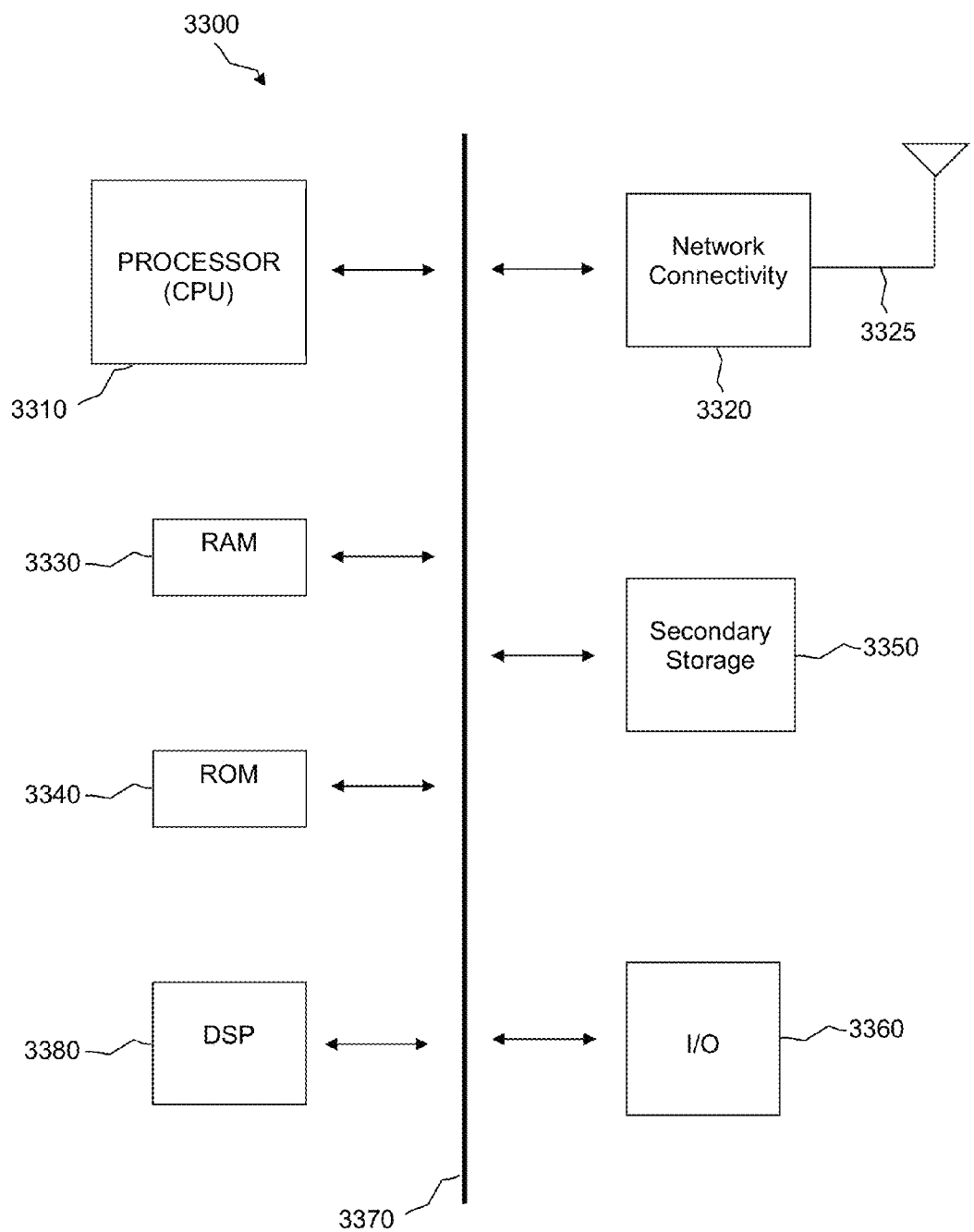
FIG. 20 illustrates a processor and related components suitable for implementing the several embodiments of the present disclosure.

FIG. 20 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method for communication in a wireless telecommunication network is provided. The method comprises transmitting, by a first cell, to a first UE, a first signal on a resource block configured to be shared by more than one cell; and transmitting, by a second cell, to a second UE, a second signal on the same resource block, wherein a specification of a location of the resource block is included in configuration information available to the first cell and the second cell.

In another embodiment, a system for communication in a wireless telecommunication network is provided. The system comprises a first cell capable of transmitting, to a first UE, a first signal on a resource block configured to be shared by more than one cell. The system further comprises a second cell capable of transmitting, to a second UE, a second signal on the same resource block, wherein a specification of a location of the resource block is included in configuration information available to the first cell and the second cell.

The following are incorporated herein by reference for all purposes: 3GPP Technical Specification (TS) 36.213, 3GPP TS 36.423, 3GPP Technical Report (TR) 36.819, and 3GPP TR 36.829.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunication network, the method comprising:
    transmitting, by a first cell, to a first user equipment (UE), a first signal on a resource block configured to be shared by more than one cell; and
    transmitting, by a second cell, to a second UE, a second signal on the same resource block, wherein a specification of a location of the resource block is included in configuration information available to the first cell and the second cell,
    wherein the configuration information is provided to the first cell and the second cell by a third cell and is determined by the third cell based on information received from the first cell and the second cell, the received information comprising at least one of:
        an indication that the first cell and the second cell are capable of sharing at least one resource block;
        a request from the first cell and the second cell for the configuration information;
        at least one maximum number of transmission layers possible in each of the first cell and the second cell; or
        at least one allowed number of transmission layers requested by each of the first cell and the second cell.

2. The method of claim 1, wherein the first signal and the second signal are transmitted to UEs capable of performing interference mitigation.

3. The method of claim 1, wherein the configuration information further comprises:
    at least one maximum number of transmission layers configured in both the first cell and the second cell; and
    at least one allowed number of transmission layers granted to each of the first cell and the second cell.

4. The method of claim 1, wherein the configuration information further comprises at least one of:
    at least one modulation format for at least one of the first cell and the second cell; and
    at least one reference signal configuration for at least one of the first cell and the second cell.

5. The method of claim 1, wherein the first cell and the second cell are within the coverage area of the third cell.

6. The method of claim 1, wherein the first cell and the second cell are not wholly within the coverage area of the third cell.

7. The method of claim 1, wherein the received information further comprises a request for at least one modulation format to be used by at least one of the first cell and the second cell.

8. The method of claim 1, wherein the first cell receives from the third cell at least one modulation format to be used by the second cell, and wherein the second cell receives from the third cell at least one modulation format to be used by the first cell.

9. The method of claim 1, wherein, after transmitting the configuration information, the third cell transmits a message to the first cell and the second cell requesting that the first cell and the second cell provide, on a one-time basis or on a periodic basis, status information regarding usage of one or more resource blocks shared by the first cell and the second cell.

10. The method of claim 9, wherein the third cell uses the status information to determine at least one different resource block that is to be shared by the first cell and the second cell, and wherein the third cell provides a location of the at least one different resource block to the first cell and the second cell.

11. The method of claim 1, wherein the configuration information is provided to the second cell by the first cell and is determined by the first cell based on information received from the second cell, the received information comprising at least one of:
    at least one maximum number of transmission layers possible in the second cell; and
    at least one allowed number of transmission layers requested by the second cell.

12. The method of claim 11, wherein the received information is received by the first cell in a response to a coordinator request message transmitted from the first cell to the second cell, the coordinator request message further including a request by the first cell to act as a coordinator for resource sharing between the first cell and the second cell, and the response further indicating acceptance or non-acceptance by the second cell of the request by the first cell to act as a coordinator.

13. The method of claim 1, wherein the configuration information is determined through a negotiation procedure performed by the first cell and the second cell, the negotiation procedure comprising the first cell and the second cell sending to one another a configuration message containing information pertinent to the respective cell, the information comprising at least one of a maximum number of transmission layers possible in the respective cell, a number of transmission layers requested by the respective cell, a reference signal configuration requested by the respective cell for signal demodulation and measurement, and a modulation format requested by the respective cell for use within shared resource blocks, wherein configuration messages continue to be exchanged between the first cell and the second cell until the first cell and the second cell agree on configuration information that is acceptable to both the first cell and the second cell.

14. A system for communication in a wireless telecommunication network, the system comprising:
    a first cell capable of transmitting, to a first user equipment (UE), a first signal on a resource block configured to be shared by more than one cell; and
    a second cell capable of transmitting, to a second UE, a second signal on the same resource block, wherein a specification of a location of the resource block is included in configuration information available to the first cell and the second cell,
wherein the configuration information is provided to the first cell and the second cell by a third cell and is determined by the third cell based on information received from the first cell and the second cell, the received information comprising at least one of:
an indication that the first cell and the second cell are capable of sharing at least one resource block;
a request from the first cell and the second cell for the configuration information;
at least one maximum number of transmission layers possible in each of the first cell and the second cell; or
at least one allowed number of transmission layers requested by each of the first cell and the second cell.

15. The system of claim 14, wherein the first signal and the second signal are transmitted to UEs capable of performing interference mitigation.

16. The system of claim 14, wherein the configuration information further comprises:
at least one maximum number of transmission layers configured in both the first cell and the second cell; and
at least one allowed number of transmission layers granted to each of the first cell and the second cell.

17. The system of claim 14, wherein the configuration information further comprises at least one of:
at least one modulation format for at least one of the first cell and the second cell; and
at least one reference signal configuration for at least one of the first cell and the second cell.

18. The system of claim 14, wherein the first cell and the second cell are within the coverage area of the third cell.

19. The system of claim 14, wherein the first cell and the second cell are not wholly within the coverage area of the third cell.

20. The system of claim 14, wherein the received information further comprises a request for at least one modulation format to be used by at least one of the first cell and the second cell.

21. The system of claim 14, wherein the first cell receives from the third cell at least one modulation format to be used by the second cell, and wherein the second cell receives from the third cell at least one modulation format to be used by first cell.

22. The system of claim 14, wherein, after transmitting the configuration information, the third cell transmits a message to the first cell and the second cell requesting that the first cell and the second cell provide, on a one-time basis or on a periodic basis, status information regarding usage of one or more resource blocks shared by the first cell and the second cell.

23. The system of claim 22, wherein the third cell uses the status information to determine at least one different resource block that is to be shared by the first cell and the second cell, and wherein the third cell provides a location of the at least one different resource block to the first cell and the second cell.

24. The system of claim 14, wherein the configuration information is provided to the second cell by the first cell and is determined by the first cell based on information received from the second cell, the received information comprising at least one of:
at least one maximum number of transmission layers possible in the second cell; and
at least one allowed number of transmission layers requested by the second cell.

25. The system of claim 24, wherein the received information is received by the first cell in a response to a coordinator request message transmitted from the first cell to the second cell, the coordinator request message further including a request by the first cell to act as a coordinator for resource sharing between the first cell and the second cell, and the response further indicating acceptance or non-acceptance by the second cell of the request by the first cell to act as a coordinator.

26. The system of claim 14, wherein the configuration information is determined through a negotiation procedure performed by the first cell and the second cell, the negotiation procedure comprising the first cell and the second cell sending to one another a configuration message containing information pertinent to the respective cell, the information comprising at least one of a maximum number of transmission layers possible in the respective cell, a number of transmission layers requested by the respective cell, a reference signal configuration requested by the respective cell for signal demodulation and measurement, and a modulation format requested by the respective cell for use within shared resource blocks, wherein configuration messages continue to be exchanged between the first cell and the second cell until the first cell and the second cell agree on configuration information that is acceptable to both the first cell and the second cell.

* * * * *